(12) United States Patent
Takahashi et al.

(10) Patent No.: US 10,505,397 B2
(45) Date of Patent: Dec. 10, 2019

(54) ELECTRODYNAMIC APPARATUS

(71) Applicant: Panasonic Intellectual Property Management Co., Ltd., Osaka (JP)

(72) Inventors: Eiji Takahashi, Nara (JP); Tsutomu Sakata, Osaka (JP); Hiroshi Kanno, Osaka (JP); Satoru Kikuchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 299 days.

(21) Appl. No.: 15/405,531

(22) Filed: Jan. 13, 2017

(65) Prior Publication Data

US 2017/0244284 A1 Aug. 24, 2017

(30) Foreign Application Priority Data

Feb. 19, 2016 (JP) .................................. 2016-029442

(51) Int. Cl.
*H02J 50/12* (2016.01)
*H02J 50/40* (2016.01)
(Continued)

(52) U.S. Cl.
CPC ................. *H02J 50/12* (2016.02); *B25J 9/02* (2013.01); *B25J 9/123* (2013.01); *B25J 18/025* (2013.01);
(Continued)

(58) Field of Classification Search
CPC ........ H02J 50/12; H02J 50/40; B25J 19/0029; B25J 18/025; B25J 19/0045; B25J 18/04;
(Continued)

(56) References Cited

U.S. PATENT DOCUMENTS 5,712,552 A 1/1998 Hirai et al.
9,461,469 B2 * 10/2016 Li ............................. H02J 3/12
(Continued)

FOREIGN PATENT DOCUMENTS

EP 722811 A1 7/1996
JP 2-218578 A 8/1990
(Continued)

OTHER PUBLICATIONS

The Extended European Search Report dated Sep. 5, 2017 for the related European Patent Application No. 17151403.7.

*Primary Examiner* — Jared Fureman
*Assistant Examiner* — Emmanuel Dominique
(74) *Attorney, Agent, or Firm* — Renner, Otto, Boisselle & Sklar, LLP

(57) ABSTRACT

An electrodynamic apparatus includes a first arm extending in a first direction, a second arm supported by the first arm, and a first linear actuator that is provided in the first arm or the second arm and moves the second arm along the first direction with respect to the first arm. The first arm includes a first power transmission antenna. The second arm includes a first power reception antenna. The first power transmission antenna supplies electric power to the first power reception antenna wirelessly. The first power reception antenna supplies the supplied electric power to a load electrically connected to the first power reception antenna.

13 Claims, 31 Drawing Sheets

(51) Int. Cl.
*B25J 9/12* (2006.01)
*B25J 18/04* (2006.01)
*B25J 19/00* (2006.01)
*B25J 9/02* (2006.01)
*B25J 18/02* (2006.01)
*F16H 19/04* (2006.01)
*F16H 25/22* (2006.01)
*F16H 25/20* (2006.01)

(52) U.S. Cl.
CPC ........... *B25J 18/04* (2013.01); *B25J 19/0029* (2013.01); *B25J 19/0045* (2013.01); *H02J 50/40* (2016.02); *F16H 19/04* (2013.01); *F16H 25/2204* (2013.01); *F16H 2025/2081* (2013.01)

(58) Field of Classification Search
CPC ......... B25J 9/02; B25J 9/123; F16H 25/2204; F16H 19/04; F16H 2025/2081
See application file for complete search history.

(56) References Cited

U.S. PATENT DOCUMENTS

| | | | |
|---|---|---|---|
| 2008/0303351 A1* | 12/2008 | Jansen | A61C 1/0015 307/104 |
| 2012/0091818 A1* | 4/2012 | Wesemann | H02J 5/005 307/104 |
| 2014/0084699 A1 | 3/2014 | Sugino et al. | |
| 2014/0091635 A1* | 4/2014 | Sugino | H02J 5/005 307/104 |

FOREIGN PATENT DOCUMENTS

| | | |
|---|---|---|
| JP | 7-100786 A | 4/1995 |
| JP | 2000-135694 A | 5/2000 |
| JP | 2014-187777 A | 10/2014 |
| JP | 2015-104764 | 6/2015 |

* cited by examiner

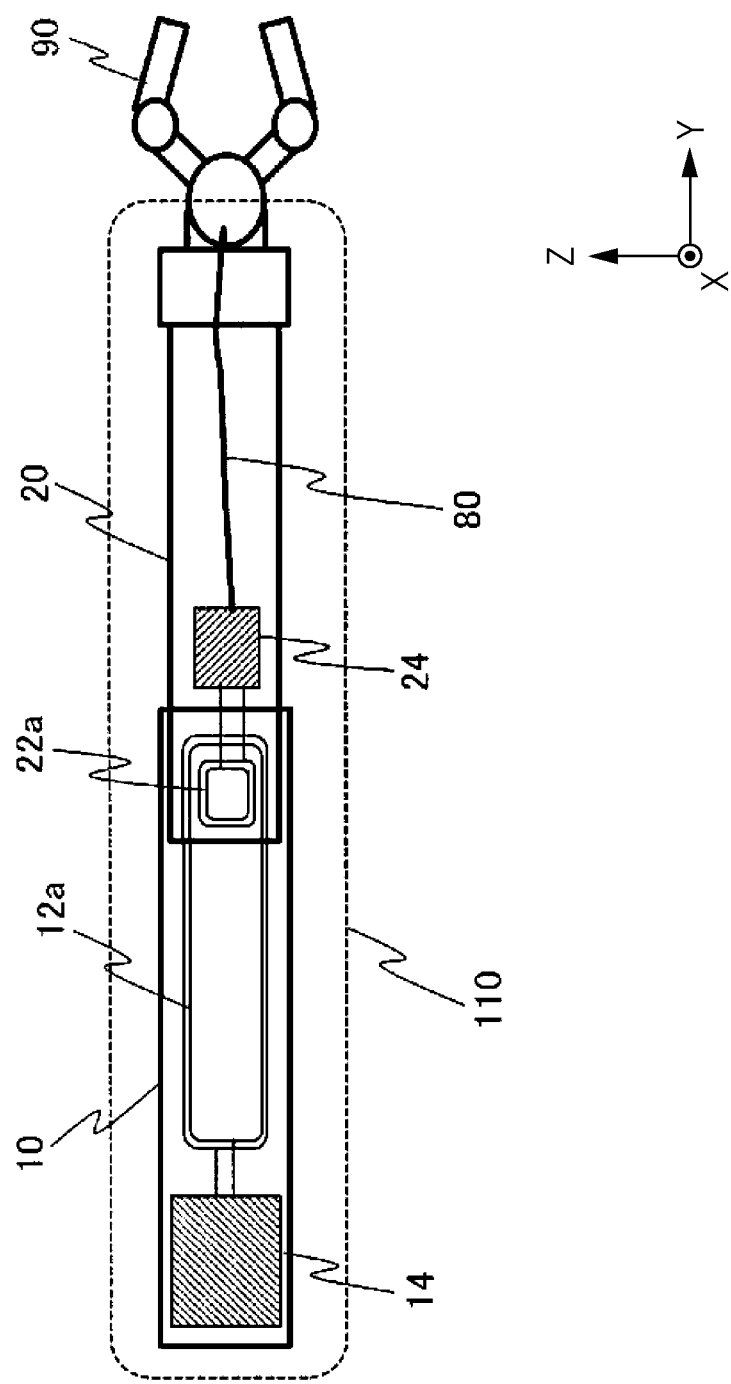

FIG. 8A
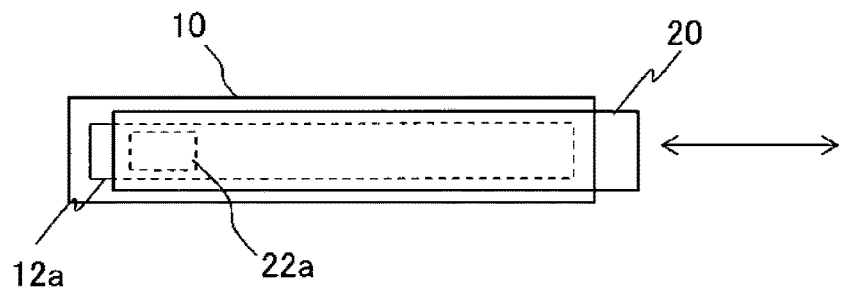
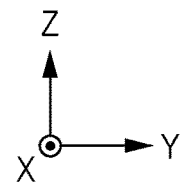
FIG. 8B
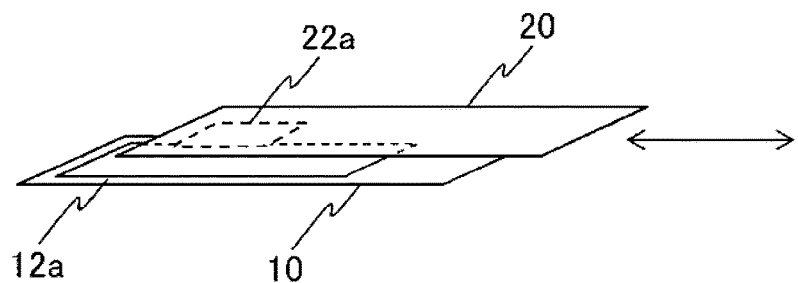
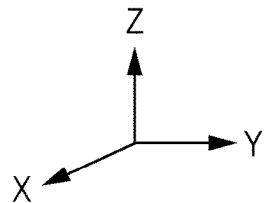

ELECTRODYNAMIC APPARATUS

BACKGROUND

1. Technical Field

The present disclosure relates to an electrodynamic apparatus including an arm.

2. Description of the Related Art

An electrodynamic apparatus (such as a robot hand apparatus) is currently under development that performs various operations with use of an end effector connected to a distal end of one or more arms. Such an electrodynamic apparatus is used in various types of work such as the carriage of goods in a factory.

Japanese Unexamined Patent Application Publication No. 2015-104764 discloses a vertical articulated robot apparatus in which a plurality of arms are serially joined via a plurality of rotatable joints. In this robot apparatus, electric power is supplied via a cable to rotating mechanisms provided in the joints and an end effector connected to a distal end of the arms.

In the conventional art, the presence of the cable in the movable parts of the arms imposes restrictions on the range of motion of the end effector.

SUMMARY

One non-limiting and exemplary embodiment provides an electrodynamic apparatus including a novel structure that may solve the aforementioned problems.

In one general aspect, the techniques disclosed here feature an electrodynamic apparatus including: a first arm extending in a first direction; a second arm supported by the first arm; and a first linear actuator that is provided in the first arm or the second arm and moves the second arm along the first direction with respect to the first arm, wherein the first arm includes a first power transmission antenna, the second arm includes a first power reception antenna, the first power transmission antenna supplies electric power to the first power reception antenna wirelessly, and the first power reception antenna supplies the supplied electric power to a load electrically connected to the first power reception antenna.

In the aspect of the present disclosure, wireless power transmission via the power transmission antenna and the power reception antenna is performed between the first arm and the second arm or between the support and the arm. This makes it possible to ease restrictions on the range of motion of an end effector.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram showing configurations of a first arm and a second arm in more detail;

FIG. 8A is a diagram showing a positional relationship between a power transmission coil and a power reception coil according to Embodiment 1;

FIG. 8B is a diagram showing an example in which a power transmission surface of the power transmission coil and a power reception surface of the power reception coil are parallel to a horizontal plane (i.e. perpendicular to the direction of gravitational force);

DETAILED DESCRIPTION

Underlying Knowledge Forming Basis of the Present Disclosure

Prior to a description of embodiments of the present disclosure, underlying knowledge forming the basis of the present disclosure is described.

The inventors found the following problems with the conventional robot apparatus described in section "2. Description of the Related Art".

Figure 1A:
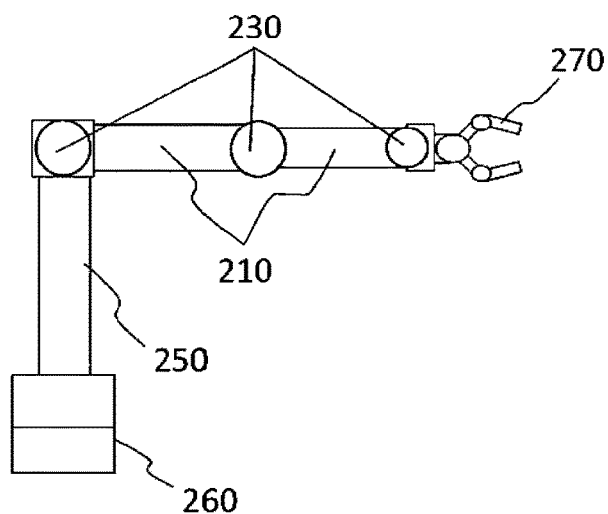
FIG. 1A is a diagram schematically showing an example (Comparative Example 1) of a vertical articulated robot.

FIG. 1A is a diagram schematically showing an example (Comparative Example 1) of a vertical articulated robot. This robot includes a support 250, two arms 210 supported by the support 250, and a hand (end effector) 270 connected to a distal end of the arms 210. The support 250, the two arms 210, and the hand 270 are serially joined via a plurality of rotatable joints 230. The support 250 is supported by a rotating mechanism 260 and can rotate about an axis extending in a vertical direction. Electric power is supplied from a power source (not illustrated) via a cable to motors provided in the joints 230 and in the hand 270.

Figure 1B:
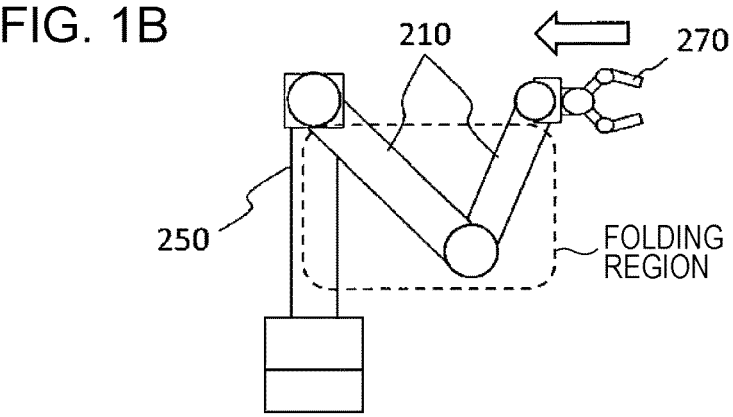
FIG. 1B is a diagram showing an example of a state where, in Comparative Example 1, a hand is close to a support with arms folded.

Such a vertical articulated robot can move the hand 270 by folding the arms 210 by rotating the joints 230. FIG. 1B shows an example of a state where the hand 270 is close to the support 250 with the arms 210 folded. In this state, there appears a folding region formed by the arms 210 being folded. This requires a larger space for installation, thus undesirably restricting the range of motion of the hand 270.

Figure 1C:
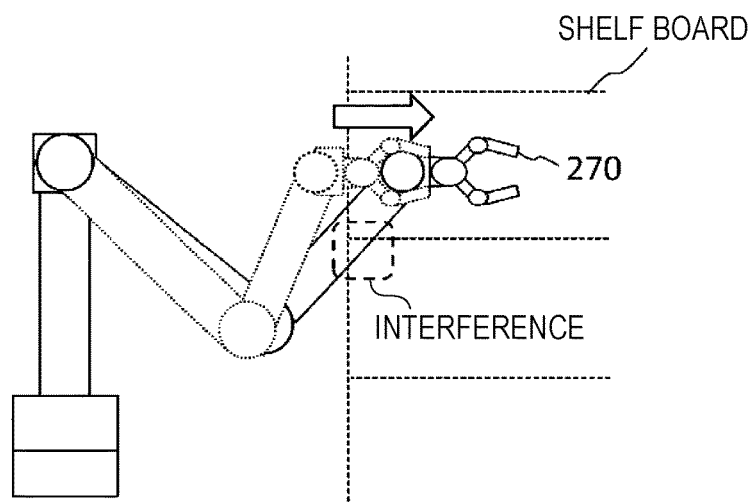
FIG. 1C is a diagram showing a problem of Comparative Example 1.

FIG. 1C is a diagram showing this problem. In the example illustrated, the hand 270 is going to grip an article on a shelf and move it to another place. Putting the hand 270 into the back of the shelf causes the folding region of the arms 210 and the shelf board to interfere with each other. This interference makes the hand 270 unable to reach the innermost part of the shelf. This makes it impossible to make full use of the length of the arms 210.

It is conceivable that such a problem may be solved by a configuration in which the hand 270 is moved backward and forward by a direct-acting mechanism instead of a rotation mechanism.

Figure 2A:
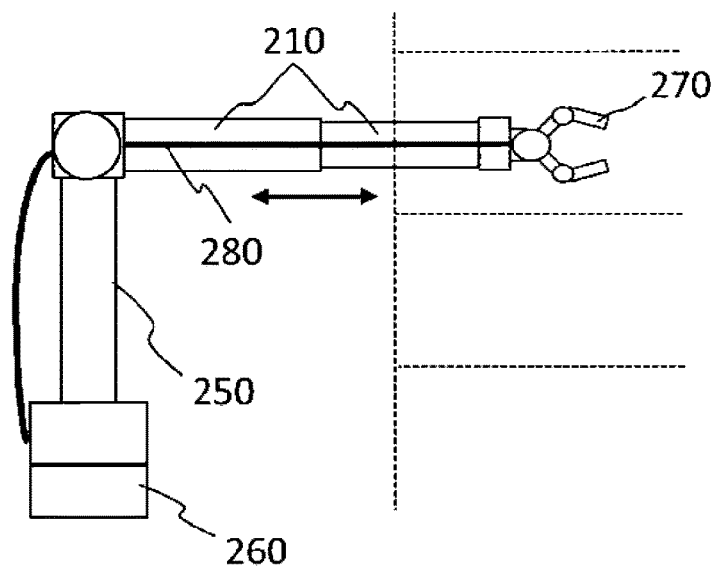
FIG. 2A is a diagram schematically showing an example (Comparative Example 2) of a robot including a mechanism that extends and retracts arms.

FIG. 2A is a diagram schematically showing an example (Comparative Example 2) of a robot having such a configuration. This robot has two arms 210 joined via a linear actuator (direct-acting mechanism) instead of a joint (rotating mechanism). This makes it possible to extend and retract the arms 210 and move the hand 270 backward and forward. The linear actuator provided in the arms 210 and the hand 270 provided at a distal end of the arms 210 are supplied with electric power via a cable 280 extending from a power source (not illustrated). Besides electric power, for example, control signals for controlling the linear actuator and the motor provided in the hand 270 are transmitted via the cable 280.

Figure 2B:
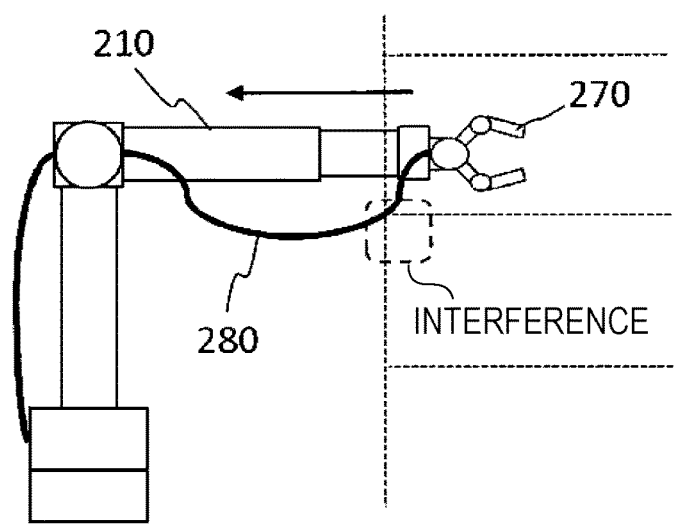
FIG. 2B is a diagram showing a problem of Comparative Example 2.

The introduction of such an extendable arm mechanism allows the hand 270 to reach the innermost part of the shelf without causing the arms 210 and the shelf board to interfere with each other. However, in the structure of this comparative example, as shown in FIG. 2B, the cable 280 and the shelf board may interfere with each other when the arms 210 retract. Furthermore, repetitive bending of the cable 280 may cause the cable 280 to deteriorate or break.

Figure 3A:
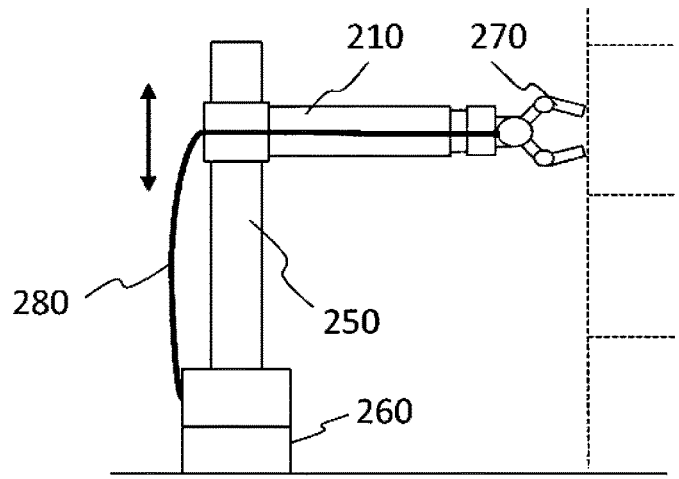
FIG. 3A is a diagram schematically showing an example (Comparative Example 3) of a robot including a mechanism that moves an arm in a direction that a support extends.

A similar problem occurs in a configuration shown in FIG. 3A, too.

FIG. 3A is a diagram schematically showing an example (Comparative Example 3) of a robot including a mechanism that moves an arm 210 in a direction that the support 250 extends. This robot has a linear actuator that causes an arm 210 supported by the support 250 to move along the direction that the support 250 extends. This allows the arm 210 to move upward and downward. In this example, too, a cable 280 is provided via which electric power is supplied from a power source (not illustrated) to the linear actuator and the hand 270.

Figure 3B:
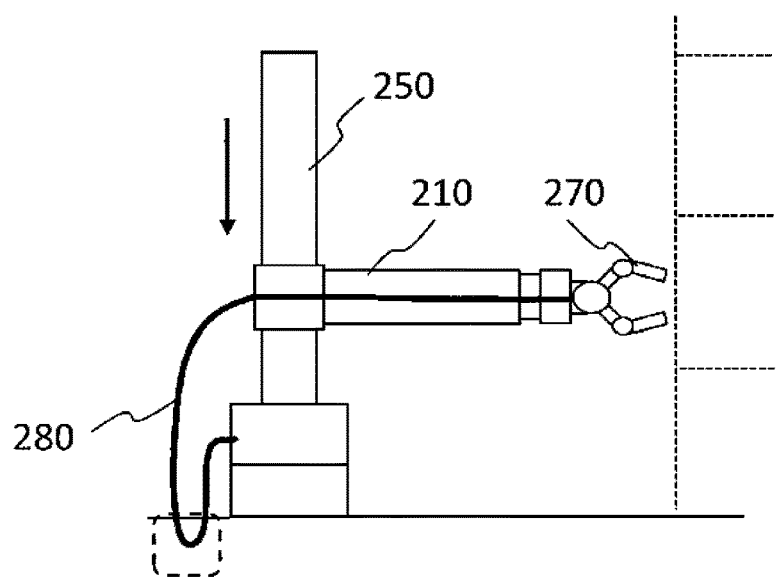
FIG. 3B is a diagram showing a problem of Comparative Example 3.

The introduction of such a directly-acting arm mechanism allows the hand 270 to move parallel to an open face of the shelf. That is, the hand 270 can be positioned with a single degree of freedom while keeping some distance to the shelf. However, in this example, too, as shown in FIG. 3B, the cable 280 may interfere with the floor. Repetitive interference and bending of the cable 280 may undesirably cause the cable 280 to deteriorate and break.

The inventors found the aforementioned problems in Comparative Examples 1 to 3 and studied configurations for solving these problems. The inventors found that the aforementioned problems can be solved by eliminating the cable from the place where the two arms 210 are joined or the place where the support 250 and an arm 210 are joined.

Based on the foregoing consideration, the inventors have conceived of the following aspects of the present disclosure.

An electrodynamic apparatus according to an aspect of the present disclosure includes:

a first arm extending in a first direction;

a second arm supported by the first arm;

a first linear actuator that is provided in the first arm or the second arm and moves the second arm along the first direction with respect to the first arm, wherein the first arm includes a first power transmission antenna, the second arm includes a first power reception antenna, the first power transmission antenna supplies electric power to the first power reception antenna wirelessly, and the first power reception antenna supplies the supplied electric power to a load electrically connected to the first power reception antenna.

According to the aspect, the first arm includes a first power transmission antenna, the second arm includes a first power reception antenna, the first power transmission antenna supplies electric power to the first power reception antenna wirelessly, and the first power reception antenna supplies the supplied electric power to a load electrically connected to the first power reception antenna.

This makes it possible to eliminate a cable via which electric power is transmitted between the first arm and the second arm. This in turn makes it possible to ease restrictions on the range of motion of an end effector. Further, as described with reference to FIGS. 2A and 2B, the presence of the cable in the movable parts of the arms makes it possible to solve the problem of interference between the cable and another object (such as a shelf or the ground) or of cable deterioration or breakage. This makes it possible to eliminate the need for maintenance such as regular replacement of cables or lessen the frequency of such maintenance.

An electrodynamic apparatus according to another aspect of the present disclosure includes: an arm extending in a first direction;

a support extending in a second direction that is different from the first direction and supporting the arm; and a linear actuator that is provided in at least either the support or the arm and moves the arm along the second direction, wherein the support includes a power transmission antenna, the arm includes a power reception antenna, the power transmission antenna supplies electric power to the power reception antenna wirelessly, and the power reception antenna supplies the supplied electric power to a load electrically connected to the power reception antenna.

According to the aspect, the support includes a power transmission antenna, the arm includes a power reception antenna, the power transmission antenna supplies electric power to the power reception antenna wirelessly, and the power reception antenna supplies the supplied electric power to a load electrically connected to the power reception antenna.

This makes it possible to eliminate a cable via which electric power is transmitted between the support and the arm. This in turn makes it possible to ease restrictions on the range of motion of an end effector. Further, thus makes it possible to solve the problem of cable deterioration or breakage described with reference to FIGS. 3A and 3B. This makes it possible to eliminate the need for maintenance such as regular replacement of cables or lessen the frequency of such maintenance.

An electrodynamic apparatus according to another aspect of the present disclosure includes: a first arm extending in a first direction;

a second arm supported by the first arm;

a linear actuator that is provided in the first arm or the second arm and moves the second arm along the first direction with respect to the first arm;

a support extending in a second direction that is different from the first direction and supporting the first arm; and a rotating mechanism that rotates the support about an axis of rotation parallel to the second direction, wherein the first arm includes a power transmission antenna, the second arm includes a power reception antenna, the power transmission antenna supplies electric power to the power reception antenna wirelessly, the power reception antenna supplies the supplied electric power to a load electrically connected to the power reception antenna, and in rotating the support, the linear actuator moves the center of gravity of the second arm closer to the axis of rotation first, and then the rotating mechanism rotates the support.

According to the aspect, the first arm includes a power transmission antenna, the second arm includes a power reception antenna, the power transmission antenna supplies electric power to the power reception antenna wirelessly, and the power reception antenna supplies the supplied electric power to a load electrically connected to the power reception antenna.

This makes it possible to eliminate a cable via which electric power is transmitted between the first arm and the second arm. This in turn makes it possible to ease restrictions on the range of motion of an end effector. Further, this makes it possible to solve the problem of cable deterioration or breakage described with reference to FIGS. 2A and 2B. This makes it possible to eliminate the need for maintenance such as regular replacement of cables or lessen the frequency of such maintenance.

Furthermore, according the aspect, in rotating the support, the linear actuator moves the center of gravity of the second arm closer to the axis of rotation first, and then the rotating mechanism rotates the support.

This reduces the acceleration and deceleration torque needed for the rotation, thus making it possible to reduce the load on the rotating mechanism (such as a motor). Further, this makes it possible to reduce the amount of space needed for the rotation of the second arm and an end effector provided at a distal end of the second arm.

An electrodynamic apparatus according to another aspect of the present disclosure includes: a support;

a rotating mechanism that is supported by the support and rotates about an axis of rotation;

a first arm that extends in a first direction, is coupled to the rotating mechanism, and rotates about the axis of rotation;

a second arm supported by the first arm;

a linear actuator that is provided in the first arm or the second arm and moves the second arm along the first direction with respect to the first arm, wherein the first arm includes a power transmission antenna, the second arm includes a power reception antenna, the power transmission antenna supplies electric power to the power reception antenna wirelessly, the power reception antenna supplies the supplied electric power to a load electrically connected to the power reception antenna, and in rotating the first arm, the linear actuator moves the center of gravity of the second arm closer to the axis of rotation first, and then the rotating mechanism rotates the first arm.

According to the aspect, the first arm includes a power transmission antenna, the second arm includes a power reception antenna, the power transmission antenna supplies electric power to the power reception antenna wirelessly, and the power reception antenna supplies the supplied electric power to a load electrically connected to the power reception antenna This makes it possible to eliminate a cable via which electric power is transmitted between the first arm and the second arm. This in turn makes it possible to ease restrictions on the range of motion of an end effector. Further, this makes it possible to solve the problem of cable deterioration or breakage described with reference to FIGS. 2A and 2B. This makes it possible to eliminate the need for maintenance such as regular replacement of cables or lessen the frequency of such maintenance.

Furthermore, according the aspect, in rotating the first arm, the linear actuator moves the center of gravity of the second arm closer to the axis of rotation first, and then the rotating mechanism rotates the first arm.

This reduces the acceleration and deceleration torque needed for the rotation, thus making it possible to reduce the load on the rotating mechanism (such as a motor). Further, this makes it possible to reduce the amount of space needed for the rotation of the second arm and an end effector provided at a distal end of the second arm.

More specific embodiments of the present disclosure are described below. Note, however, that an excessively detailed description may be omitted. For example, a detailed description of an already well-known matter and a repeated description of substantially identical components may be omitted. This is intended to avoid unnecessary redundancies of the following description and facilitate understanding of persons skilled in the art. It should be noted that the inventors provide the accompanying drawings and the following description so that persons skilled in the art can fully understand the present disclosure, and that the accompanying drawings and the following description are not intended to limit the subject matters recited in the claims. In the following description, identical or similar constituent elements are given the same reference numerals.

Embodiment 1

Figure 4:
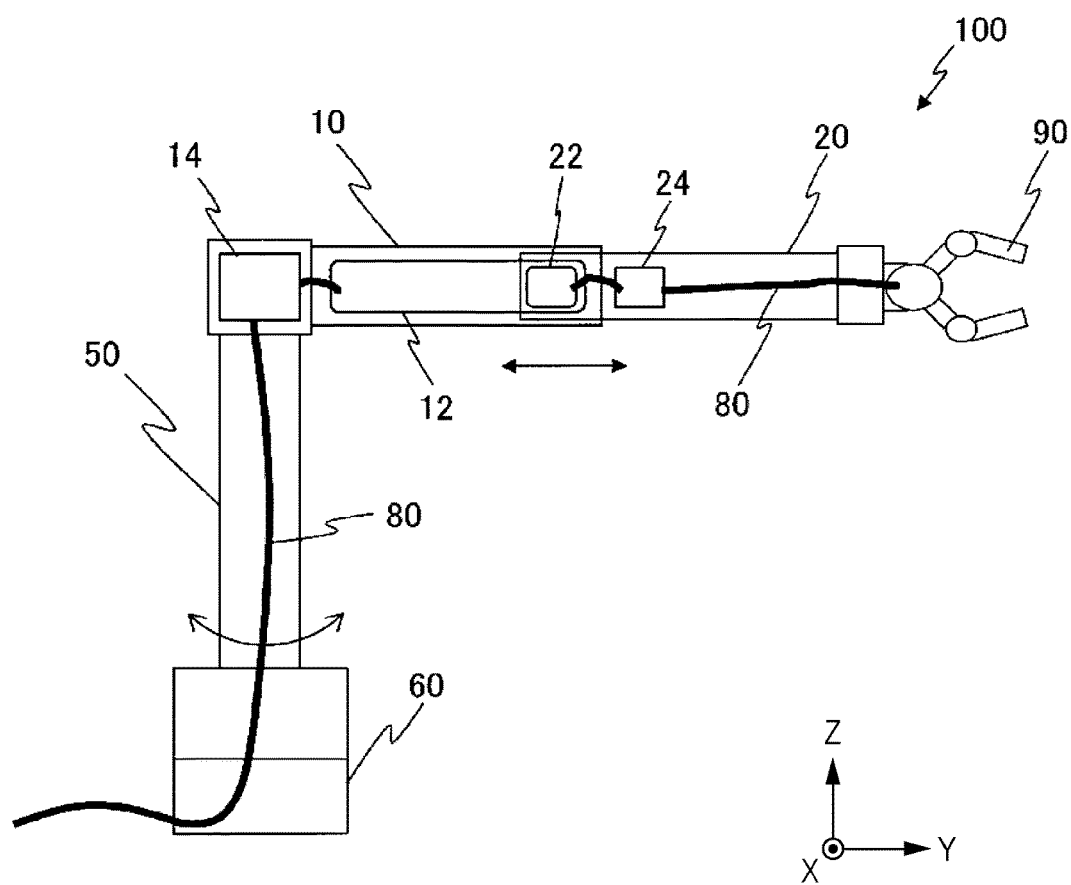
FIG. 4 is a diagram schematically showing a configuration of an electrodynamic apparatus according to Embodiment 1 of the present disclosure.

FIG. 4 is a diagram schematically showing a configuration of an electrodynamic apparatus 100 according to Embodiment 1 of the present disclosure. The electrodynamic apparatus 100 is a robot hand apparatus that is used, for example, in the carriage of goods in a factory.

The following description uses XYZ coordinates indicating X, Y, and X directions that are orthogonal to one another. The X axis and the Y axis are set parallel to a horizontal plane, and the Z axis is set in a vertical direction. The coordinate system illustrated is set for convenience of description and not intended to restrict the position and orientation in which an apparatus according to an embodiment of the present disclosure is actually used. Further, the shape and size of the whole or part of a structure illustrated are not intended to restrict the actual shape and size, either.

The electrodynamic apparatus 100 according to Embodiment 1 includes a first arm 10 extending in a first direction (which is the Y direction in the example shown in FIG. 4), a second arm 20 supported by the first arm 10, and a linear actuator (direct-acting mechanism; not illustrated). As will be described later, the linear actuator is provided in the first arm 10 or the second arm 20. The linear actuator moves the second arm 20 along the first direction (Y direction) with respect to the first arm 10. This makes it possible to increase and reduce the whole length of the arms 10 and 20. In the following description, the first arm 10 may be referred to as "fixed arm", and the second arm 20 may be referred to as "movable arm".

The first arm 10 includes a power transmission antenna 12, and the second arm 20 includes a power reception antenna 22. Electric power is supplied from the power transmission antenna 12 to the power reception antenna 22 wirelessly. In Embodiment 1, the first arm 10 and the second arm 20 are not connected via a cable.

The electrodynamic apparatus 100 further includes a support 50 that supports the first arm 10. The support 50 extends in a second direction (which is the Z direction in the example shown in FIG. 4) that is different from the first direction (Y direction). The first direction and the second direction do not need to be orthogonal to each other. The support 50 is supported by a rotating mechanism 60. The rotating mechanism 60 includes a motor, and the motor produces a turning force that causes the support 50 to rotate about an axis parallel to the second direction (Z direction). This allows an end effector 90 to make a rotational movement centered at the support 50.

The end effector 90 is attached to a distal end of the second arm 20. The end effector 90 is electrically connected to the power transmission antenna 22 of the second arm 20. In Embodiment 1, the end effector 90 is a robot hand and has a mechanism that grips an article. In addition to the mechanism that grips an object, the end effector 90 may have another mechanism, e.g. a mechanism that rotates or extends and retracts the end effector 90. The end effector 90 is not limited to a hand, but may for example be a drill. In addition to a power arrangement such as a motor, the end effector 90 may include another device such as a camera, a sensor, and a light source. The end effector 90 may be any device that operates on electric power. The end effector 90 can be detached from the second arm 20 and replaced by another end effector.

The end effector 90 is an example of a load in the present disclosure. The term "load" herein means any device that operates on electric power. The term "load" encompasses a device such as a motor, a camera (image pickup device), a light source, a secondary battery, and an electronic circuit (e.g. a power converter circuit or a microcontroller). The term "load electrically connected to a power reception antenna" herein means the whole or part of a device that is connected to a stage following the power transmission antenna (i.e. to the distal end) and can receive electric power from the power reception antenna.

The electrodynamic apparatus 100 further includes a power transmission circuit 14 and a power reception circuit 24. The power transmission circuit 14 is connected between a power source (not illustrated) and the power transmission antenna 12 via a cable 80. The power reception circuit 24 is connected between the power reception antenna 22 and the end effector 90 via the cable 80. The power transmission circuit 14 includes an inverter circuit that supplies AC power to the power transmission antenna 12. The power reception circuit 24 includes a rectifier circuit (rectifier) that converts AC power supplied from the power reception antenna 22 into DC power and output the DC power to the end effector 90. Configurations of the power transmission circuit 14 and the power reception circuit 24 will be described later.

In Embodiment 1, the power transmission antenna 12 and the power reception antenna 22 are elements that transmit electric power wirelessly. The power transmission antenna 12 includes a power transmission coil, and the power reception antenna 22 includes a power reception coil. Electromagnetic coupling between the power transmission coil and the power reception coil causes electric power to be transmitted from the power transmission coil to the power reception coil wirelessly. More specifically, magnetic field coupling (electromagnetic induction or resonant magnetic field coupling) between the power transmission coil and the power reception coil causes electric power to be transmitted from the power transmission coil to the power reception coil wirelessly. The AC power from the inverter circuit provided in the power transmission circuit 14 is supplied to the power transmission coil. This AC power causes the power transmission coil to generate a magnetic field that causes electric power to be transmitted to the power reception coil.

It should be noted that the power transmission antenna 12 and the power reception antenna 22 may transmit electric power wirelessly by electric field coupling (capacitive coupling) instead of magnetic field coupling. In wireless power transmission based on electric field coupling, each of the antennas may include a pair of flat electrodes and a resonant circuit including an inductor and a capacitor. Electric power can be transmitted to a pair of power reception electrodes wirelessly by causing the pair of power reception electrodes to face a pair of power transmission electrodes and supplying AC power to the pair of power transmission electrodes.

The electric power supplied from the power transmission antenna 12 is supplied by the power reception antenna 22 to the end effector 90 via the power transmission circuit 24. This causes a plurality of motors provided in the end effector 90 to be driven to enable an operation.

Figure 5:
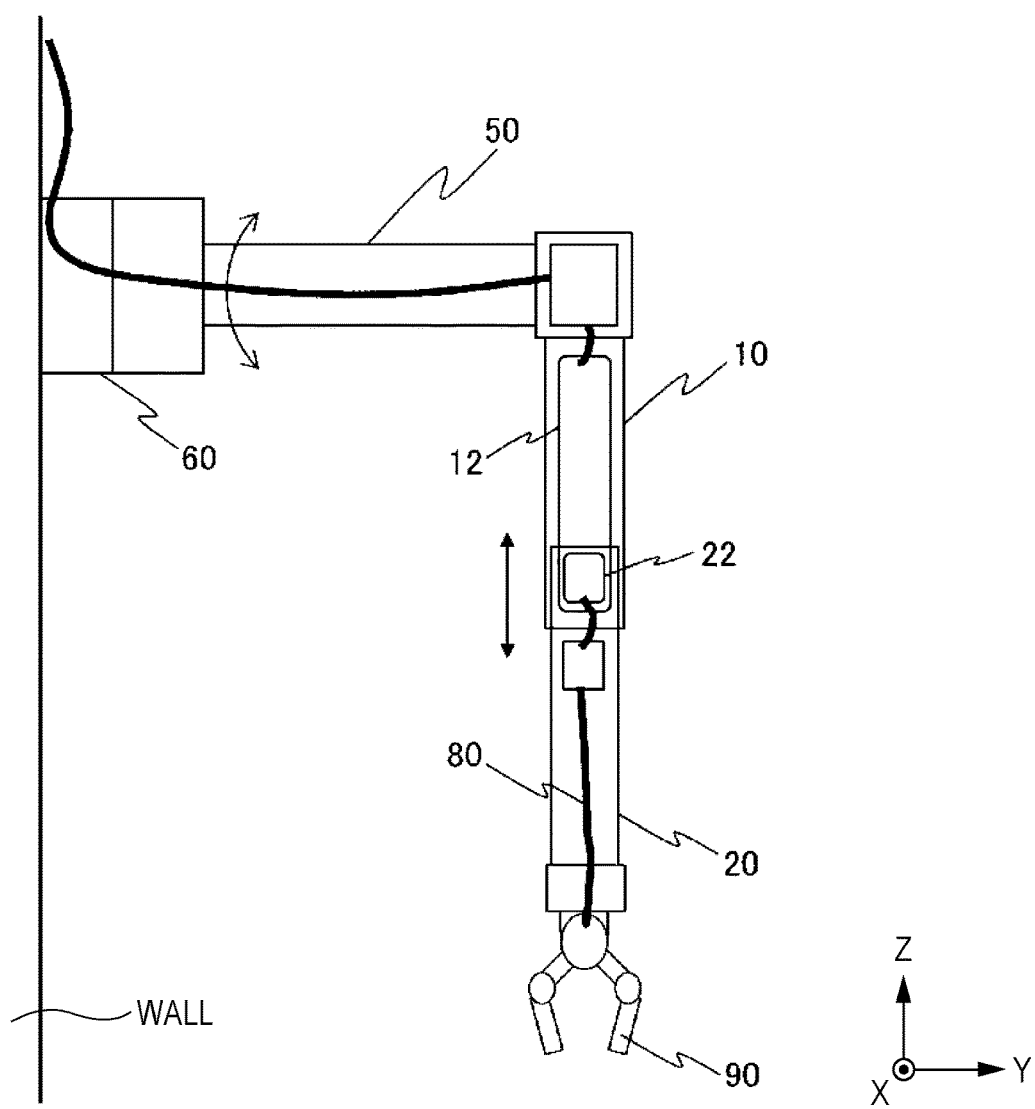
FIG. 5 is a diagram showing another example of placement of the electrodynamic apparatus according to Embodiment 1 of the present disclosure.

In FIG. 4, the electrodynamic apparatus 100 is configured such that the direction (first direction) that the arms 10 and 20 extend is parallel to the horizontal plane and the direction (second direction) that the support 50 extends is perpendicular to the horizontal plane. However, the electrodynamic apparatus 100 is not limited to this configuration. For example, as shown in FIG. 5, the electrodynamic apparatus 100 may be configured such that the first direction is perpendicular to the horizontal plane and the second direction is parallel to the horizontal plane.

FIG. 6 is a diagram showing configurations of the first arm 10 and the second arm 20 in more detail. In the following description, the first arm 10 and the second arm 20 may be referred to collectively as "telescopic arm 110". The telescopic arm 110 may be distributed alone independently of the end effector 90 and the support 50. That is, an electrodynamic apparatus of the present disclosure does not need to include a support 50, a rotating mechanism 60, and an end effector 90.

As shown in FIG. 6, in Embodiment 1, the first arm 10 includes the power transmission circuit 14 and a power transmission coil 12a connected to the power transmission circuit 14. The second arm 20 includes a power reception coil 22a and the power reception circuit 24, which is connected to the power reception coil 22a. The power transmission coil 12a has a wound wire that is longer in shape in the first direction (Y direction) and the second direction (Z direction) than that of the power reception coil 22a. Since the wound wire of the power transmission coil 12a is longer in the Y direction than that of the power reception coil 22a, the power transmission coil 12a and the power reception coil 22a are kept facing each other even when the second arm 20 moves along the Y direction. This makes it possible to transmit electric power even while performing an operation of extending and retracting the arms 10 and 20. It should be noted that although, in FIG. 6, the length of the power reception coil 22a in the first direction (Y direction) is shorter than the length of the power transmission coil 12a in the first direction (Y direction), these lengths may alternatively be equal.

Although not shown in FIG. 6, the first arm 10 or the second arm 20 includes the linear actuator, which moves the second arm 20 along the Y direction with respect to the first arm 10. The following describes example configurations of the linear actuator.

Figure 7A:
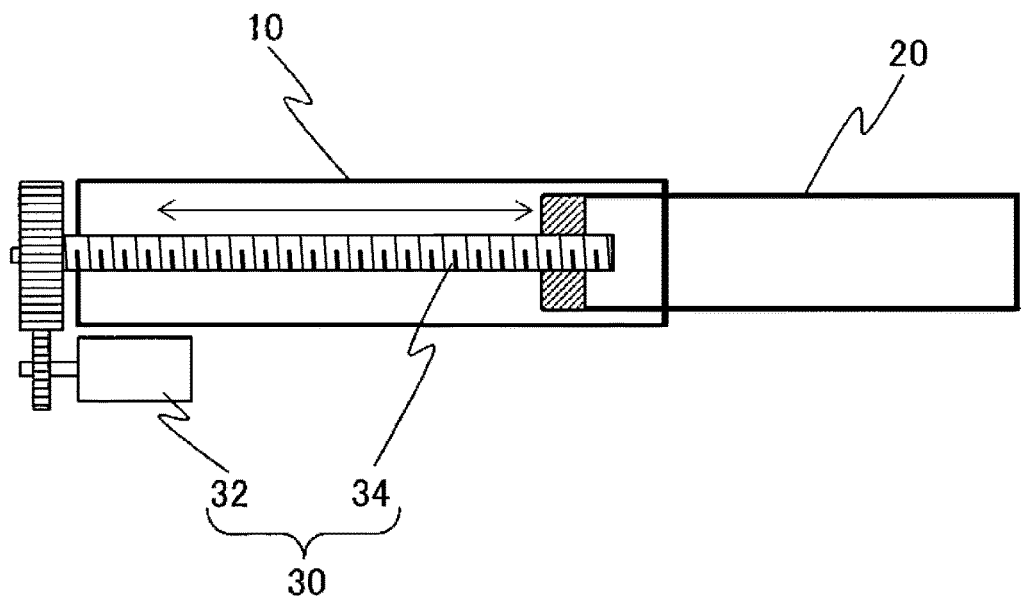
FIG. 7A is a diagram showing an example configuration of a linear actuator.

FIG. 7A is a diagram showing an example configuration of a linear actuator 30. In this example, the linear actuator 30 is provided in the first arm 10. The linear actuator 30 includes a motor 32 and a ball screw 34. The ball screw 34 has a distal end connected to one end of the second arm 20. The motor 32 produces a turning force that is transmitted to the ball screw 34 via a plurality of gears, so that the ball screw 34 rotates. As the ball screw 34 rotates, the second arm 20 moves along the first direction. Such a linear actuator 30 may be provided in the second arm 20.

Figure 7B:
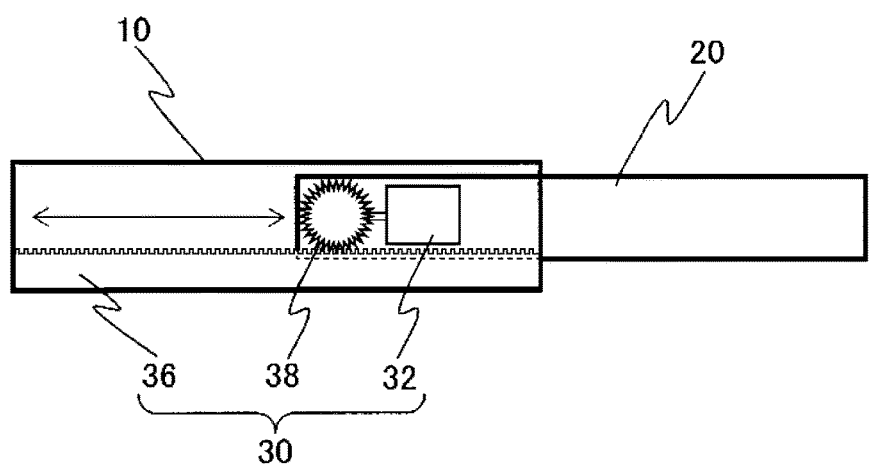
FIG. 7B is a diagram showing another example configuration of a linear actuator.

FIG. 7B is a diagram showing another example configuration of a linear actuator 30. In this example, the linear actuator 30 includes a motor 32 and a rack and pinion (a rack 36 and a pinion 38). The rack 36 is provided on an inner side surface of the first arm 10, and the motor 32 and the pinion 38 are provided at one end of the second arm 20. The motor 32 produces a turning force that is transmitted to the pinion 38, so that the pinion 38 rotates. As the pinion 38 rotates, the second arm 20 moves along the first direction with respect to the rack 36. As in the example shown in FIG. 7B, some of the components of the linear actuator 30 may be provided in the first arm 10, and the other may be provided in the second arm 20. Such an embodiment, too, corresponds to an embodiment in which the first arm 10 or the second arm 20 includes the linear actuator 30.

Besides these structures, a similar function can be achieved, for example, by using a motor and a belt. The linear actuator 30 is not limited to a particular structure, but may have any structure.

FIG. 8A is a diagram showing a positional relationship between the power transmission coil 12a and the power reception coil 22a according to Embodiment 1. In FIG. 8A, the power transmission coil 12a is larger in size than the power reception coil 22a. It should be noted that although, in FIG. 8A, the power transmission coil 12a is larger in size than the power reception coil 22a, a relationship in size between the power transmission coil 12a and the power reception coil 22a is not limited to the aforementioned relationship. Note here that the term "power transmission surface" refers to a surface surrounded by the outside edge of the power transmission coil 12a and the term "power reception surface" refers to a surface surrounded by the outside edge of the power reception coil 22a. In Embodiment 1, the power transmission coil 12a and the power reception coil 22a are disposed so that the power transmission surface and the power reception surface are parallel to the direction of a load applied to the second arm 20 (which is the negative direction of the Z axis in the example shown in FIG. 8A). The direction of the load varies according to aspects of installation of the electrodynamic apparatus 100. For example, while the direction of the load coincides with the second direction in the placement of FIG. 4, the direction of the load coincides with the first direction in the placement of FIG. 5.

In a normal environment, the direction of the load coincides with the direction of gravitational force (vertically downward direction). However, in an environment where an external field (e.g. an electric field or a magnetic field) is acting besides a gravitational field, the direction of the load is the direction of a combination of those external forces. In a case where a configuration of Embodiment 1 is applied to a robot that is used in outer space, where almost no gravitation force is acting and an electric field or a magnetic field is acting, the coils are disposed so that the direction of a force produced by the electric field or the magnetic field is parallel to the power transmission surface and the power reception surface.

FIG. 8B is a diagram showing an example in which the power transmission surface of the power transmission coil 12a and the power reception surface of the power reception coil 22a are parallel to the horizontal plane (i.e. perpendicular to the direction of gravitational force). It should be noted that FIG. 8B only shows those side surfaces of the first arm 10 and the second arm 20 on which the coils are provided. The coils 12a and 22a may be disposed as shown in this example. However, electric power transmission can be performed more stably by disposing the coils 12a and 22a as shown in FIG. 8A. This advantageous effect is described with reference to FIG. 9A to FIG. 10.

Figure 9A:
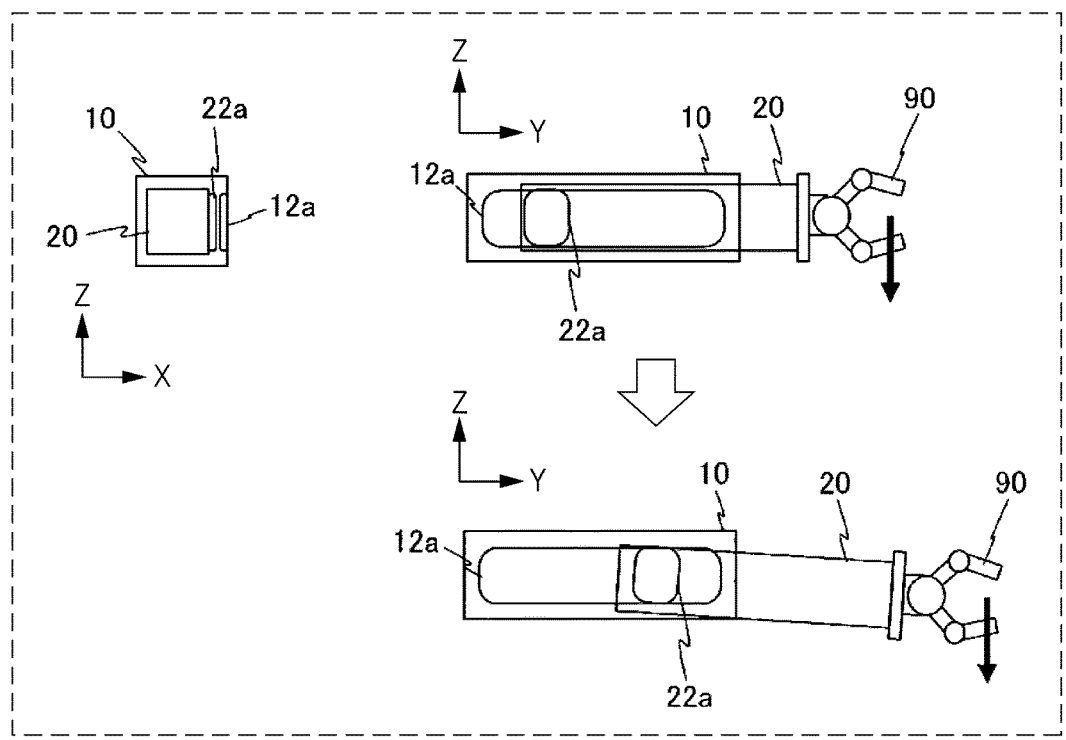
FIG. 9A is a diagram schematically showing an effect of extension of the second arm in the configuration shown in FIG. 8A.

FIG. 9A is a diagram schematically showing an effect of extension of the second arm 20 in the configuration shown in FIG. 8A. The picture on the left side of FIG. 9A shows the appearance of the first arm 10 and the second arm 20 as seen from the negative direction of the Y axis. The picture on the right side of FIG. 9A shows a change that occurs in the positional relationship between the coils 12a and 22a when the second arm 20 is extended. When the second arm 20 moves in the Y direction, the load applied to the second arm 20 causes the second arm 20 to tilt. This tilt becomes larger as the second arm 20 becomes more extended and as the end effector 90 comes to hold a heavier article.

Figure 9B:
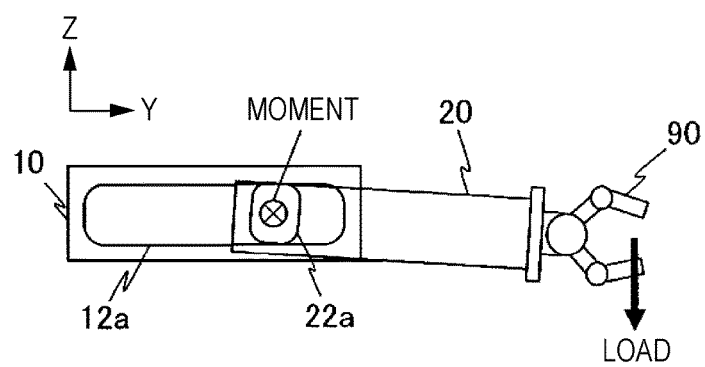
FIG. 9B is a first diagram showing the direction of the moment of a force produced by a load.
Figure 9C:
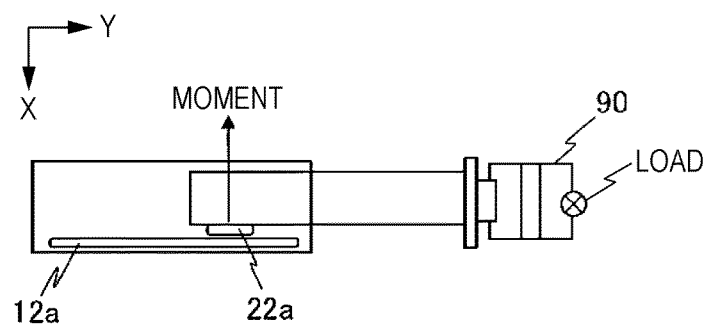
FIG. 9C is a second diagram showing the direction of the moment of the force produced by the load.

FIGS. 9B and 9C show the direction of the moment of a force produced by the load. FIG. 9B shows the appearance of the telescopic arm 110 as seen from the positive direction of the X axis. FIG. 9C shows the appearance of the telescopic arm 110 as seen from the positive direction of the Z axis. The direction of the moment is determined by the exterior product of a position vector from the point of generation of the moment to the position of application of the load and a load vector. Application of a load to the end effector 90 provided at the distal end of the arm 20 causes the moment of a force to be generated in the −X direction as shown in FIGS. 9B and 9C. In Embodiment 1, the coils are disposed so that the power transmission surface of the power transmission coil 12a and the power reception surface of the power reception coil 22a are perpendicular to the direction of the moment. In other words, the coils are disposed so that the power transmission surface and the power reception surface are parallel to the direction of the load (gravitational force). This placement causes the moment of the force produced by the load to act so that the power reception coil 22a rotates about an axis perpendicular to the power reception surface. As a result, only an insignificant effect is exerted on the state in which the coils face each other.

Thus, in the configuration shown in FIG. 9A, there is almost no change in the distance between the power transmission coil 12a and the power reception coil 22a even in a case where the second arm 20 tilts. This makes it possible to prevent the coupling coefficient coupling coefficient between the coils 12a and 22a from fluctuating.

Figure 9D:
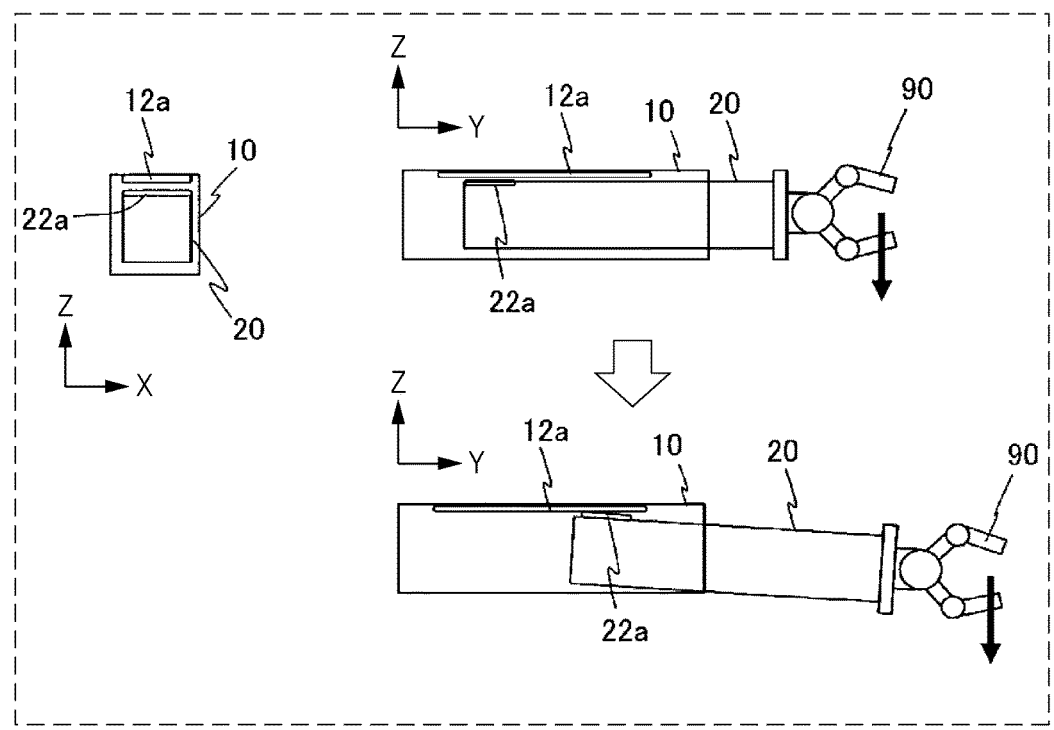
FIG. 9D is a diagram schematically showing an effect of extension of the second arm in the configuration shown in FIG. 8B.

FIG. 9D is a diagram schematically showing an effect of extension of the second arm 20 in the configuration shown in FIG. 8B. The picture on the left side of FIG. 9D shows the appearance of the first arm 10 and the second arm 20 as seen from the negative direction of the Y axis. The picture on the right side of FIG. 9D shows a change that occurs in the positional relationship between the coils 12a and 22a when the second arm 20 is extended. In this configuration, when the second arm 20 is extended, the load applied to the second arm 20 causes a partial change in the distance between the power transmission coil 12a and the power reception coil 22a. This entails a change in the coupling coefficient between the power transmission coil 12a and the power reception coil 22a.

Figure 10:
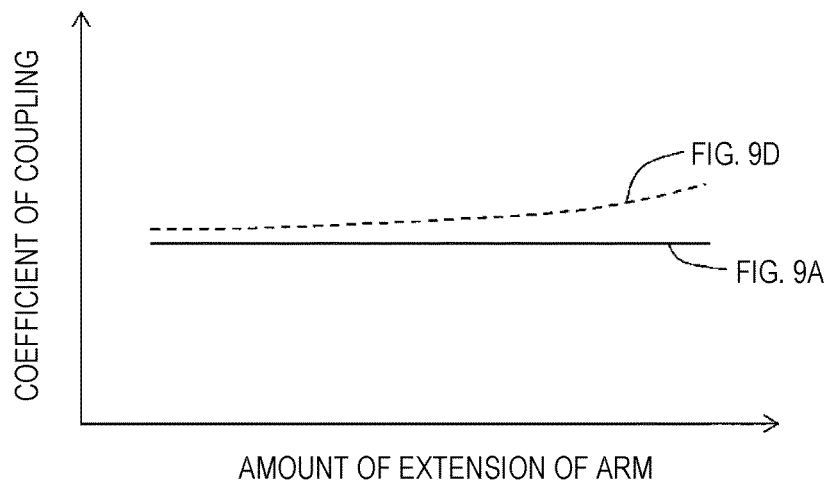
FIG. 10 is a graph showing an example of a change in the coupling coefficient coupling coefficient as a function of an amount of extension of the second arm in each of the configurations of FIGS. 9A and 9D.

FIG. 10 is a graph showing an example of a change in the coupling coefficient as a function of an amount of extension of the second arm 20 in each of the configurations of FIGS. 9A and 9D. In FIG. 10, the dotted line indicates a change in the coupling coefficient in the configuration shown in FIG. 9D, and the solid line indicates a change in the coupling coefficient in the configuration shown in FIG. 9A. In the configuration of FIG. 9D, an increase in the amount of extension of the arm 20 leads to a decrease in distance between the coils 12a and 22a as a whole, thus leading to an increase in the coupling coefficient. Contrary to this example, as the amount of extension of the arm 20 becomes larger, the distance between the coils may become larger and, accordingly, the coupling coefficient may become smaller. On the other hand, in the configuration of FIG. 9A, there is almost no change in the coupling coefficient even when the amount of extension of the arm 20 becomes larger.

Thus, as shown in FIG. 9A, a change in the coupling coefficient that is entailed by extension or retraction of the arm 20 can be prevented by disposing the coils so that the power transmission surface and the power reception surface are parallel to the direction of the load applied to the second arm 20. This enables more stable electric power transmission.

In the example configurations shown in FIGS. 9A and 9D, the power transmission coil 12a is located on an outer side, and the power reception coil 22a is located on an inner side. Since a metal shield is present on the outer side of the power transmission coil 12a, the power reception coil 22a may be located on an outer side, and the power transmission coil 12a may be located on an inner side, contrary to these configurations in which radiation of electromagnetic noise can be prevented.

Figure 11:
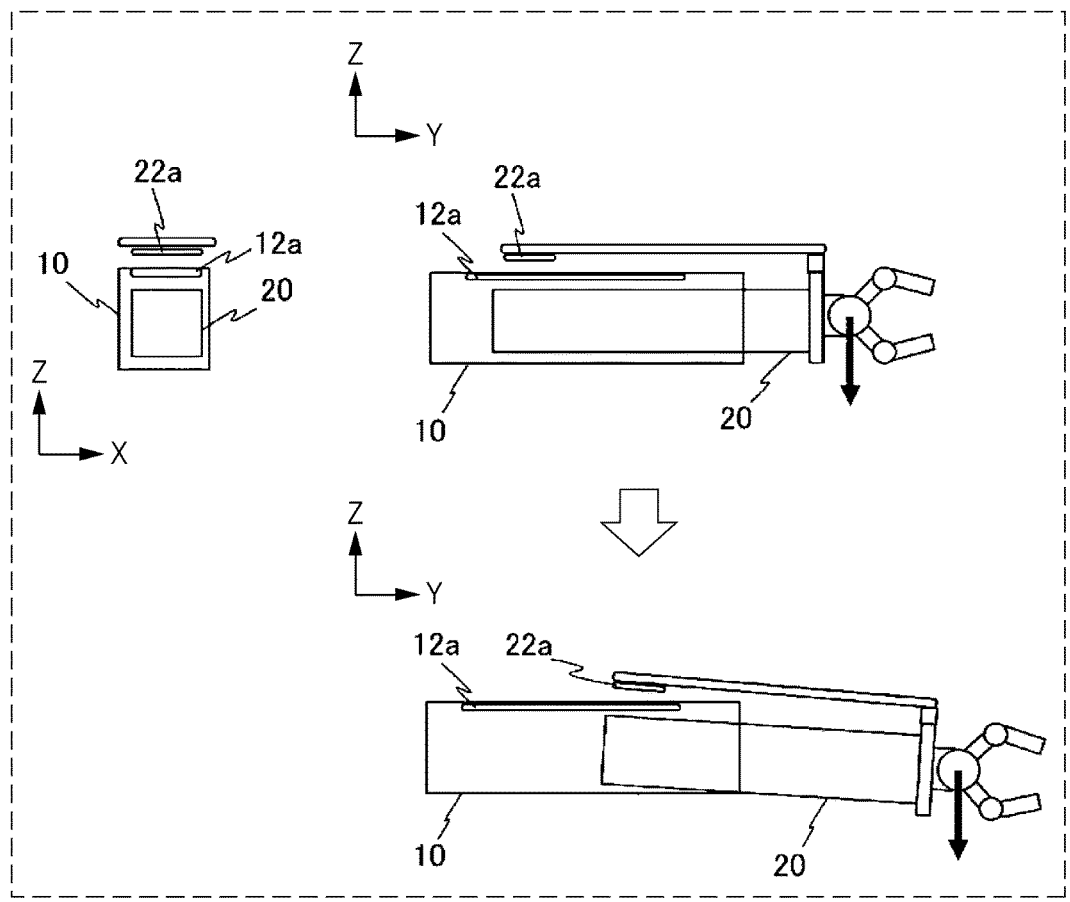
FIG. 11 is a diagram showing another example of an electrodynamic apparatus.

FIG. 11 is a diagram showing an example of an electrodynamic apparatus 100 having such a configuration. In this example, the second arm 20 has a portion that faces an outer surface of the first arm 10, and the power transmission coil 22a is provided in the portion. For this reason, the power reception coil 22a faces an outer side of the power transmission coil 12a. In the example shown in FIG. 11, as in the example shown in FIG. 9D, the power transmission surface and the power reception surface are parallel to the horizontal plane (i.e. perpendicular to the direction of the load). However, in this case, too, more stable electric power transmission is enabled by disposing the coils so that the power transmission surface and the power reception surface are perpendicular to the horizontal plane (i.e. parallel to the direction of the load).

Next, a circuit configuration of the electrodynamic apparatus 100 according to Embodiment 1 is described.

Figure 12A:
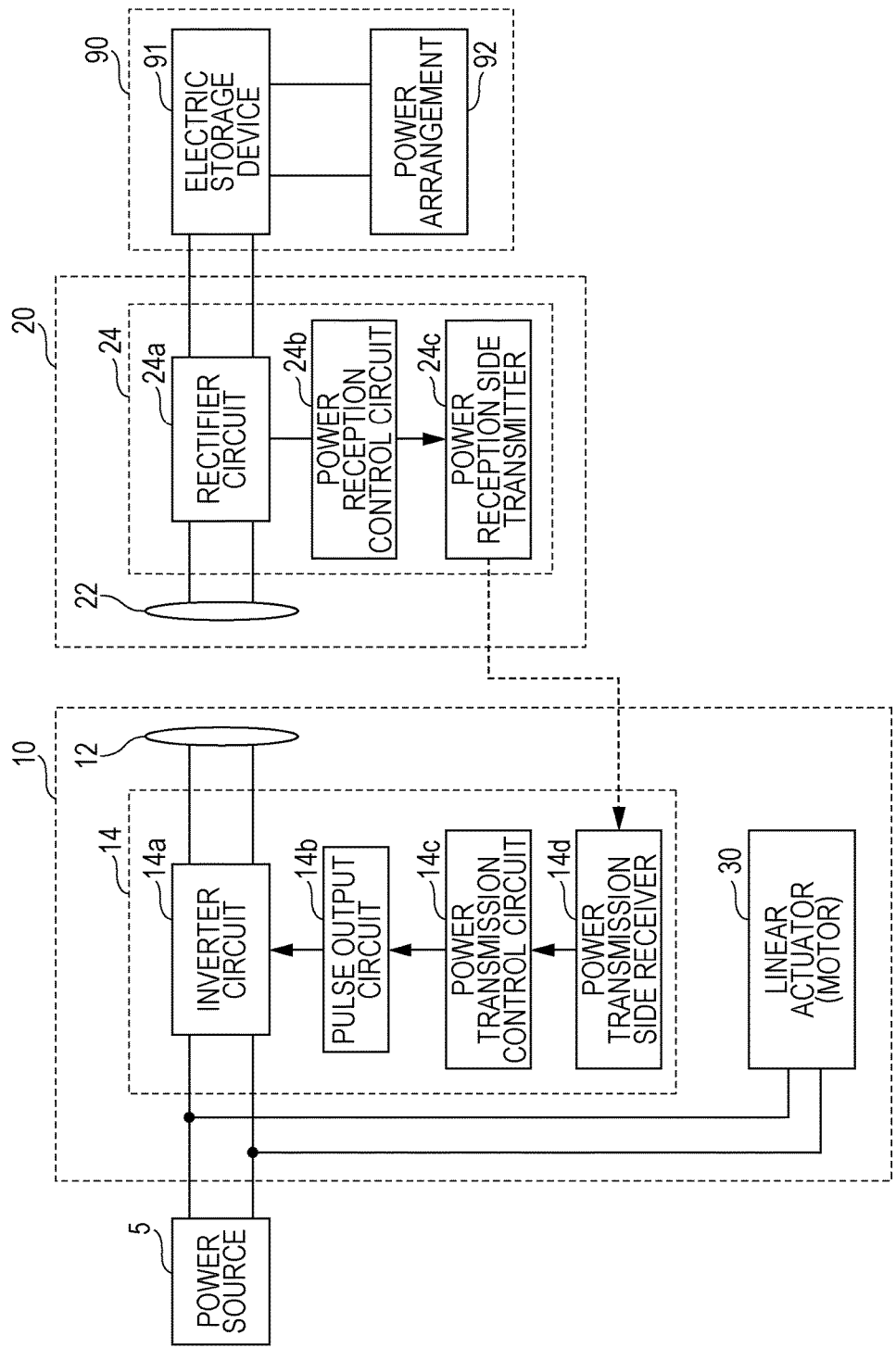
FIG. 12A is a block diagram showing an example of a circuit configuration of the electrodynamic apparatus.

FIG. 12A is a block diagram showing an example of a circuit configuration of the electrodynamic apparatus 100. The electrodynamic apparatus 100 according to Embodiment 1 can be deemed as a wireless power transmission system including a power transmission apparatus and a power reception apparatus. The first arm 10 corresponds to the power transmission apparatus, and the second arm 20 corresponds to the power reception apparatus. In the example shown in FIG. 12A, the first arm 10 has its motor provided in the linear actuator 30. In the following description, the motor of the linear actuator 30 may be referred to simply as "linear actuator 30".

The first arm 10 includes the power transmission circuit 14, the power transmission antenna 12, and the linear actuator 30. The power transmission circuit 14 includes an inverter circuit 14a, a pulse output circuit 14b, a power transmission control circuit 14c, and a power transmission side receiver 14d. The pulse output circuit 14b is for example a gate driver circuit and supplies pulse signals to a plurality of switching elements of the inverter circuit 14a in response to an instruction from the power transmission control circuit 14c. The power transmission control circuit 14c is an integrated circuit, such as a microcontroller, including a memory and a processor. By the processor executing a computer program stored in the memory, the pulse output circuit 14b, the linear actuator 30, and the like are controlled.

The inverter circuit 14a and the linear actuator 30 are connected to an external power source 5 and receive DC power from the power source 5. The inverter circuit 14a converts the supplied DC power into AC power and outputs the AC power. The linear actuator 30 is driven by the supplied DC power to move the second arm 20.

The power reception circuit 24 provided in the second arm 20 includes a rectifier circuit 24a, a power reception control circuit 24b, and a power reception side transmitter 24c. The rectifier circuit 24a is a publicly-known rectifier circuit such as a single-phase full-wave rectifier circuit or a single-phase half-wave rectifier circuit. The rectifier circuit 24a converts AC power outputted from the power the power reception antenna 22 into DC power and outputs the DC power. The power reception control circuit 24b measures the value of the DC voltage outputted from the rectifier circuit 24a and gives the power reception side transmitter 24c an instruction for transmission.

The power reception side transmitter 24c transmits, to the power transmission side receiver 14d, information needed for electric power transmission. Such information may for example be information indicating the value of power or voltage that is supplied to the end effector 90. In response to the information, the power transmission control circuit 14c performs feedback control, for example, to keep constant voltage being supplied to the end effector 90. Communication between the power reception side transmitter 24c and the power transmission side receiver 14d can be performed by a publicly-known method such as amplitude modulation or wireless LAN. In a case where the communication is performed by amplitude modulation, the power reception side transmitter 24c may include a load modulation circuit connected to a stage preceding or following the rectifier circuit 24a. The power transmission side receiver 14d may include a demodulation circuit that reads information, for example, on the basis of a change in amplitude of voltage between the inverter circuit 14a and the power transmission antenna 12.

In this example, the end effector (load) 90 includes an electric storage device 91 and a power arrangement 92. The electric storage device 91 is a secondary battery or a capacitor and stores supplied electric power. The power arrangement 92 includes one or more motors. If not necessary, the electric storage device 91 may be omitted.

Figure 12B:
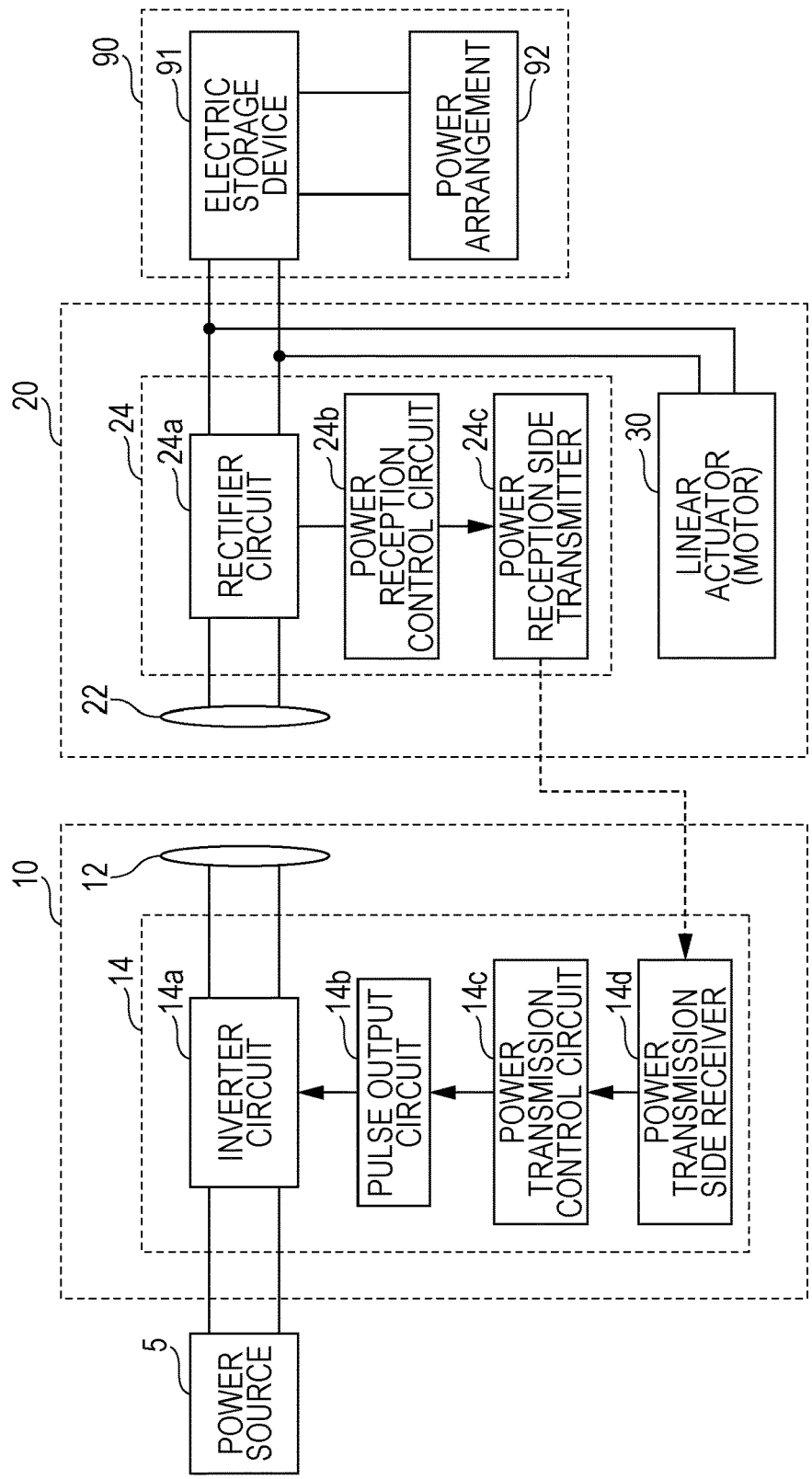
FIG. 12B is a diagram showing another example of a circuit configuration of the electrodynamic apparatus.

FIG. 12B is a diagram showing another example configuration of the electrodynamic apparatus 100. In this example, the motor of the linear actuator 30 is mounted in the second arm 20. The linear actuator 30 is supplied with DC power outputted from the rectifier circuit 24a. This allows the linear actuator 30 to move the second arm 20 with respect to the first arm 10.

The following describes each of the constituent elements in more detail.

Figure 13:
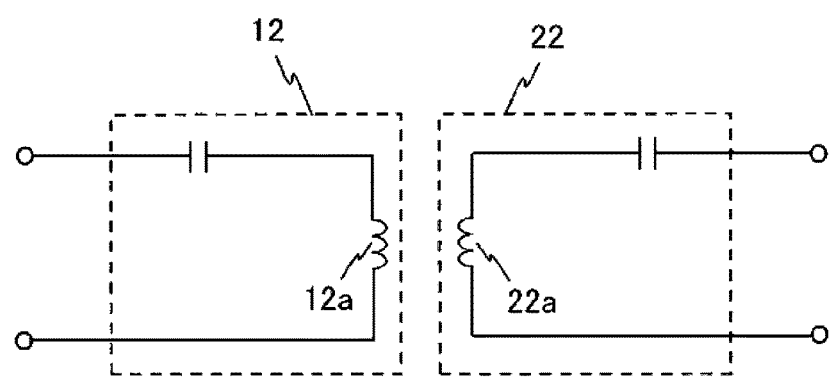
FIG. 13 is a diagram showing equivalent circuits of a power transmission antenna and a power reception antenna.

FIG. 13 is a diagram showing equivalent circuits of the power transmission antenna 12 and the power reception antenna 22. The power transmission antenna 12 and the power reception antenna 22 each has a configuration of a resonant circuit including a coil and a capacitor as shown in FIG. 13. Each of the antennas is not limited to a series resonant circuit, but may be a parallel resonant circuit. Each of the coils 12a and 22a may for example be a planar coil or laminated coil formed on a circuit substrate or a wire-wound coil including a copper wire, a litz wire, or a twisted wire. Each of the capacitors used may for example be any type of capacitor that has a chip shape or a lead shape. A capacitance between two wires with air therebetween may function as such a capacitor. These capacitors may be replaced by the self-resonant characteristics of the respective coils.

The resonant frequency f0 of a typical resonant circuit is set to coincide with the transmission frequency f at the time of electric power transmission. The resonant frequency f0 of each of the resonant circuits does not need to strictly coincide with the transmission frequency f. For example, the resonant frequency f0 may be set to take on a value falling within the range of 50 to 150% of the transmission frequency f. The frequency f of electric power transmission may be set to be for example 50 Hz to 300 GHz, more preferably 20 kHz to 10 GHz, still more preferably 20 kHz to 20 MHz, even more preferably 20 kHz to 1 MHz.

The DC power source 5 may be any power source such as a commercial power source, a primary battery, a secondary battery, a solar battery, a fuel battery, a USB (universal serial bus) power source, a high-capacity capacitor (such as an electric double layer capacitor), or a voltage converter connected to a commercial power source.

Figure 14A:
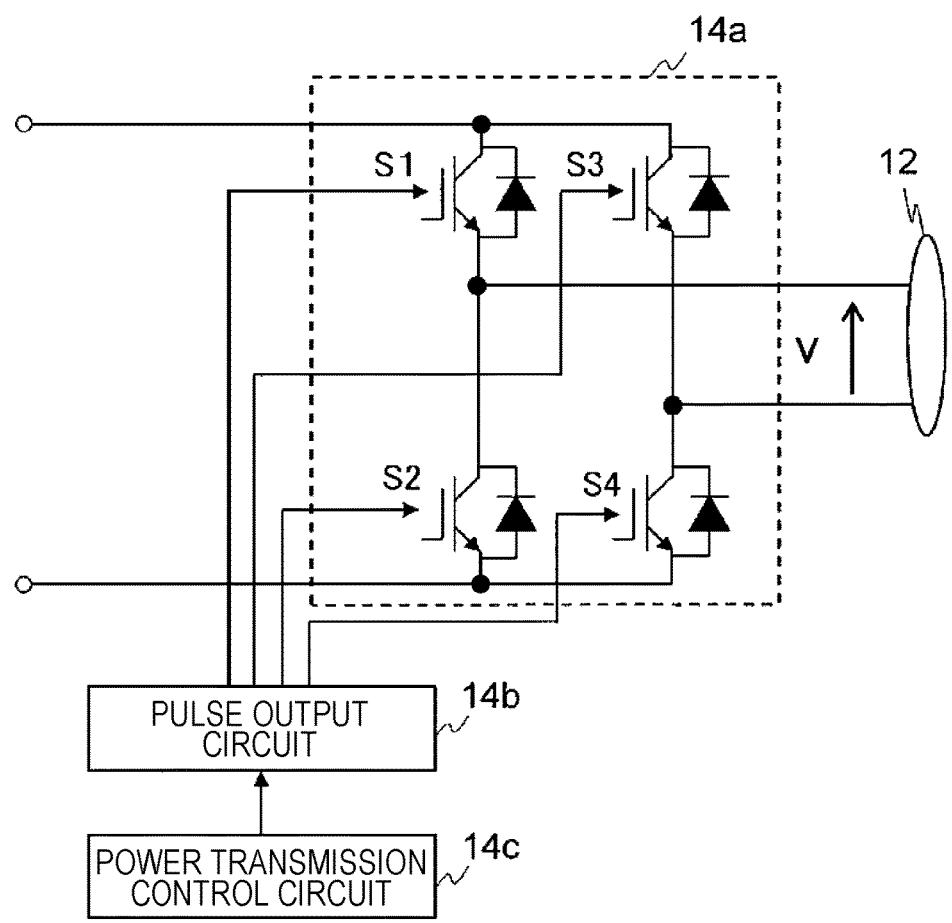
FIG. 14A is a diagram showing an example configuration of an inverter circuit.

FIG. 14A is a diagram showing an example configuration of the inverter circuit 14a. The inverter circuit 14a includes a plurality of switching elements S1 to S4 that switch between a conductive state and a non-conductive state in accordance with pulse signals supplied from the pulse output circuit 14b. Inputted DC power can be converted into AC power by switching each of the switching elements between the conductive state and the non-conductive state. In the example shown in FIG. 14A, the inverter circuit 14a is a full-bridge inverter circuit including four switching elements S1 to S4. In this example, each of the switching elements is an IGBT (insulated-gate bipolar transistor). Alternatively, each of the switching elements may be another type of switching element such as a MOSFET (metal-oxide semiconductor field-effect transistor).

In the example shown in FIG. 14A, the switching elements S1 and S4 (referred to as "first pair of switching elements") of the four switching elements S1 to S4, when in the conductive state, output a voltage of the same polarity as the supplied DC voltage. Meanwhile, the switching elements S2 and S3 (referred to as "second pair of switching elements") of the four switching elements S1 to S4, when in the conductive state, output a voltage of the opposite polarity to the supplied DC voltage. The pulse output circuit 14b supplies pulse signals to the gates of the four switching elements S1 to S4 in accordance with an instruction from the power transmission control circuit 14c. In so doing, the amplitude of voltage that is outputted can be controlled by adjusting the phase difference between two pulse signals that are supplied to the first pair of switching elements (S1 and S4) and the phase difference between two pulse signals that are supplied to the second pair of switching elements (S2 and S3).

Figure 14B:
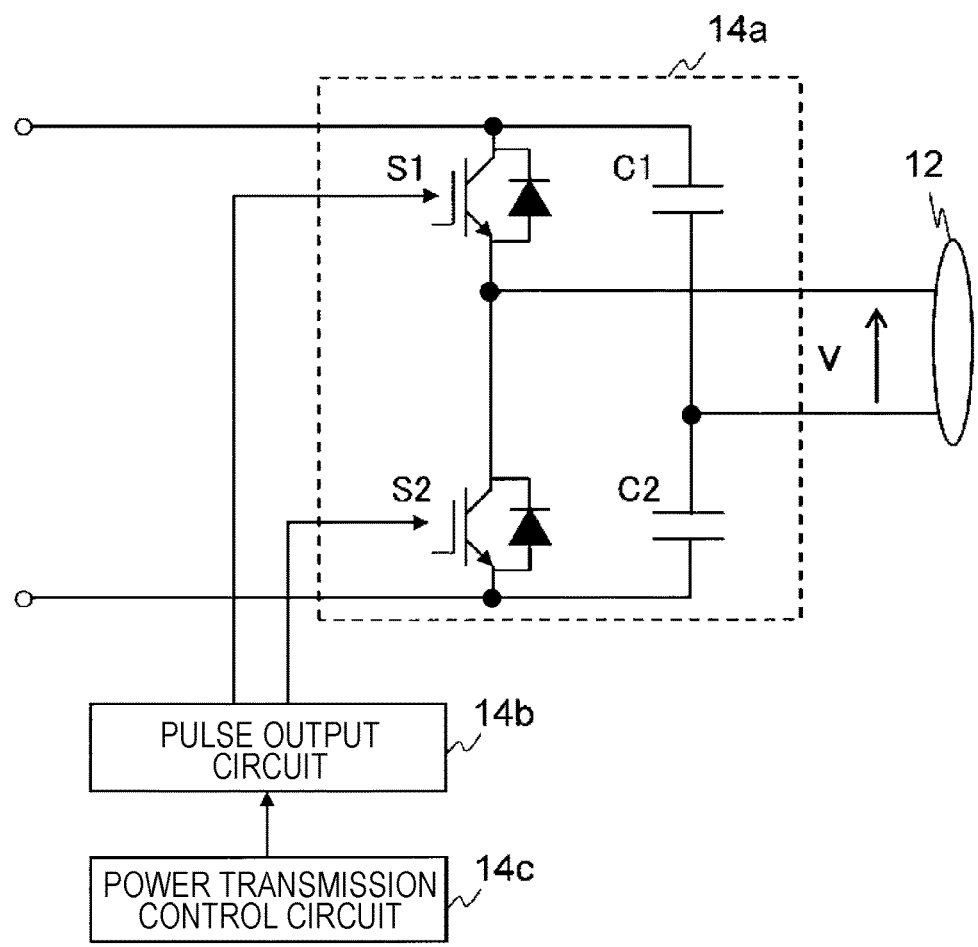
FIG. 14B is a diagram showing another example configuration of the inverter circuit.

FIG. 14B is a diagram showing another example configuration of the inverter circuit 14a. In this example, the inverter circuit 14a is a half-bridge inverter circuit. In a case where a half-bridge inverter circuit is used, the aforementioned phase control cannot be applied. In this case, the amplitude of output voltage can be controlled by controlling a duty ratio of pulse signals that are inputted to the respective switching elements.

The inverter circuit 14a shown in FIG. 14B is a half-bridge inverter circuit including two switching elements S1 and S2 and two capacitors C1 and C2. The two switching elements S1 and S2 and the two capacitors C1 and C2 are connected in parallel. One end of the power transmission antenna 12 is connected to a point between the two switching elements S1 and S2, and the other end of the power transmission antenna 12 is connected to a point between the two capacitors C1 and C2.

The power transmission control circuit 14c and the pulse output circuit 14b supply pulse signals to the respective switching elements so that the switching elements S1 and S2 are alternately turned on. This allows the DC power to be converted into AC power.

In this example, the output time ratio of output voltage V (i.e. the proportion of a nonzero period to one cycle) can be adjusted by adjusting the duty ratio of pulse signals (i.e. the proportion of an on period to one cycle). This makes it possible to adjust the amplitude of voltage of AC power that is inputted to the power transmission antenna 12. Such duty control can be similarly applied also in a case where a full-bridge inverter circuit such as that shown in FIG. 14A is used.

Figure 15:
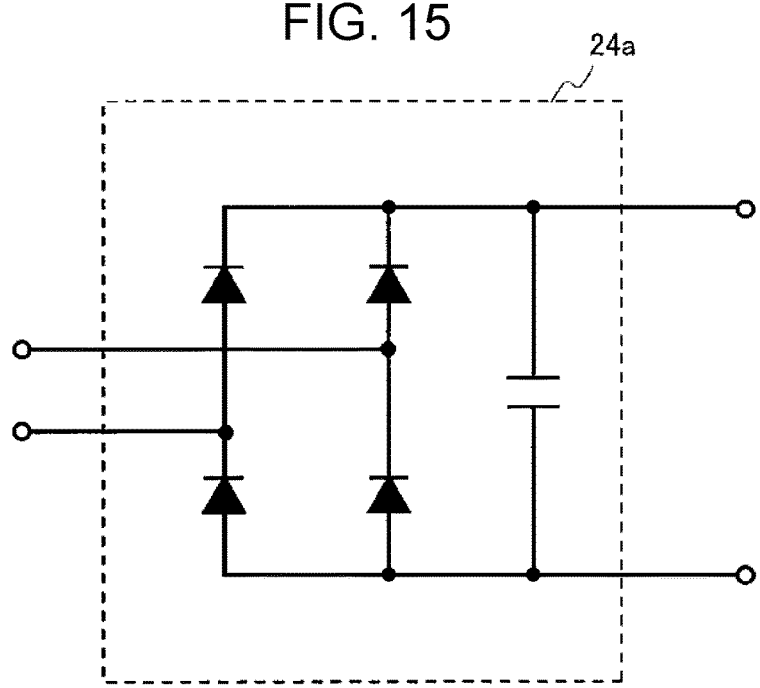
FIG. 15 is a diagram showing an example configuration of a rectifier circuit.

FIG. 15 is a diagram showing an example configuration of the rectifier circuit 24a. In this example, the rectifier circuit 24a is a full-wave rectifier circuit including a diode bridge and a smoothing capacitor. The rectifier circuit 24a may include another configuration of a rectifier circuit. The rectifier circuit 24a receives AC energy, converts the AC energy into DC energy that can be used by the end effector 90 serving as a load, and outputs the DC power.

Embodiment 1 allows electric power to be transmitted wirelessly via a movable part between the first arm 10 and the second arm 20. This makes it possible to eliminate a cable via which electric power is transmitted. This in turn makes it possible to ease restrictions on the range of motion of the end effector. Further, this makes it possible to solve the problem of cable deterioration or breakage described with reference to FIGS. 2A and 2B.

Embodiment 2

Figure 16:
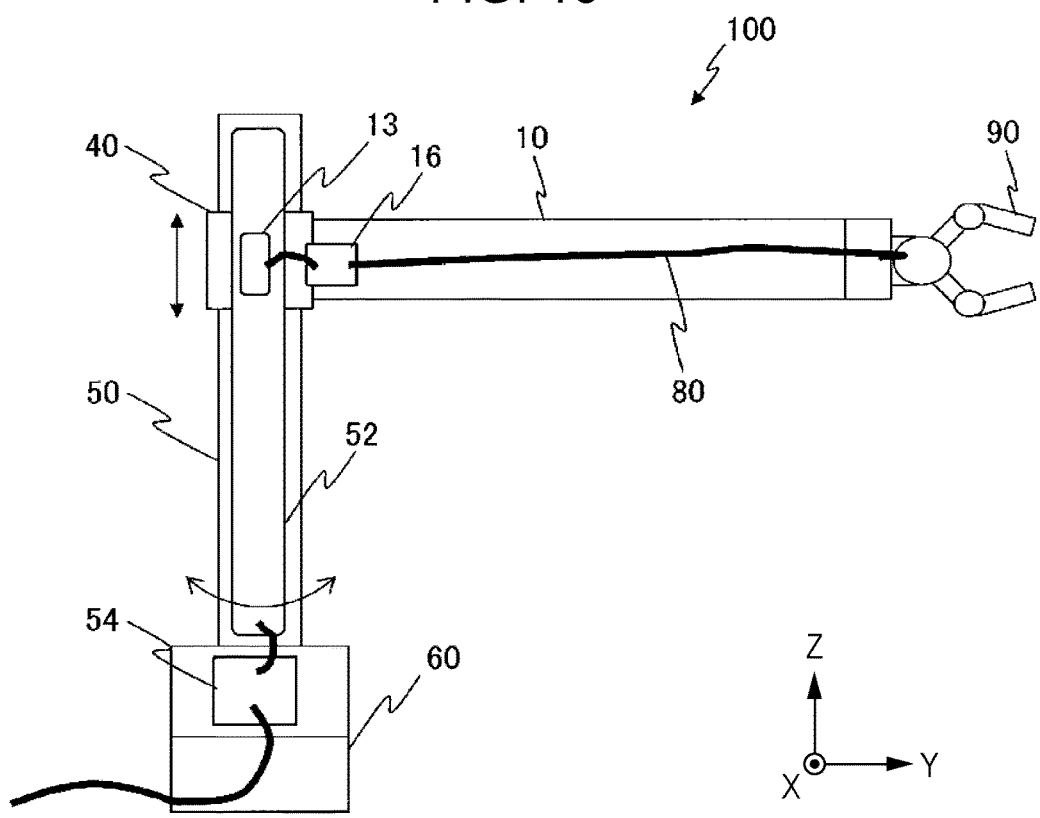
FIG. 16 is a diagram showing a configuration of an electrodynamic apparatus according to Embodiment 2 of the present disclosure.

FIG. 16 is a diagram showing a configuration of an electrodynamic apparatus 100 according to Embodiment 2 of the present disclosure. The electrodynamic apparatus 100 according to Embodiment 2 differs from the electrodynamic apparatus 100 according to Embodiment 1 in that the mechanism that extends and retracts arms is replaced by a mechanism that moves an arm 10 along a direction that a support 50 extends.

The electrodynamic apparatus 100 includes an arm 10 extending in a first direction (which is the Y direction in the example illustrated), a support 50 extending in a second direction that is different from the first direction and supporting the arm 10, and a linear actuator 40 that is provided in the support 50 or the arm 10 moves the arm 10 along the second direction. The support 50 includes a power transmission antenna 52 and a power transmission circuit 54 connected to the power transmission antenna 52. The power transmission circuit 54 includes an inverter circuit that supplies AC power to the power transmission antenna 52. The arm 10 includes a power reception antenna 13 and a power reception circuit 16 connected to the power reception antenna 13. The power reception circuit 16 includes a rectifier circuit that converts AC power received by the power reception antenna 13 into DC power and supplies the DC power to an end effector (load) 90. The power reception antenna 13 and the end effector 90 are connected via a cable 80.

In Embodiment 2, the power transmission antenna 52 provided in the support 50 supplies electric power wirelessly to the power reception antenna 13 provided in the arm 10. The power reception antenna 13 supplies the supplied electric power to the end effector 90 electrically connected to the power reception antenna 13 via the power reception circuit 16.

The power transmission antenna 52 includes a power transmission coil 52a, and the power reception antenna 13 includes a power reception coil 13a. The power transmission antenna 52 and the power reception antenna 13 are identical in configuration to the power transmission antenna 12 and the power reception antenna 22 according to Embodiment 1. That is, the power transmission coil 52a is electromagnetically coupled to the power reception coil 13a and supplies electric power to the power reception coil 13a wirelessly. A power transmission surface surrounded by the outside edge of the power transmission coil 52a and a power reception surface surrounded by the outside edge of the power reception coil 13a are parallel to the direction of a load applied to the arm 10.

The power transmission circuit 54 connected to the power transmission antenna 52 and the power reception circuit 16 connected to the power reception antenna 13 are identical in configuration to the power transmission circuit 14 and the power reception circuit 24 according to Embodiment 1, respectively. The power transmission circuit 54 includes an inverter circuit connected between an external power source and the power transmission antenna 52. AC power is supplied from the inverter circuit to the power transmission antenna 52. The power reception circuit 16 includes a rectifier circuit connected between the power reception antenna 13 and the end effector 90. DC power is supplied from the rectifier circuit to the end effector 90 via the cable 80.

Figure 17:
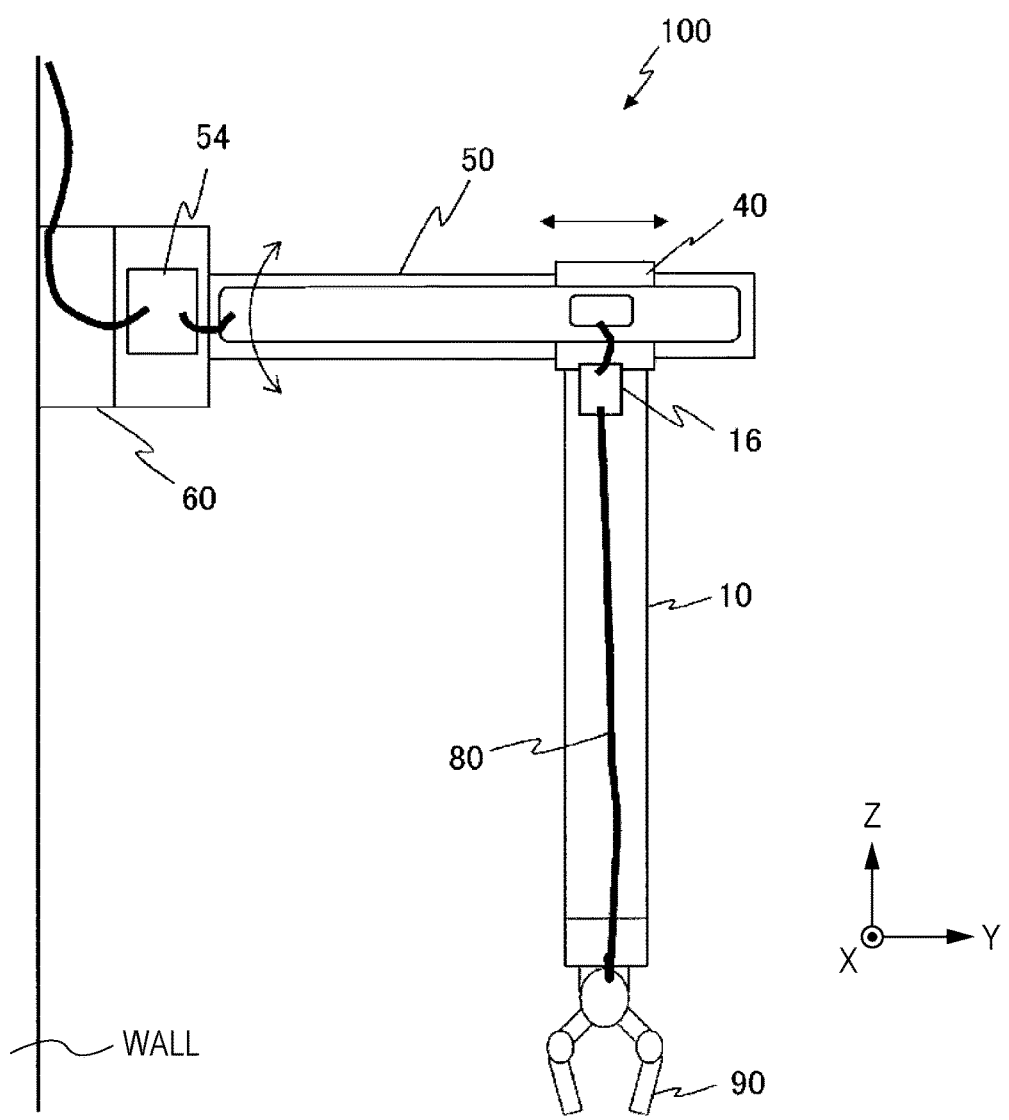
FIG. 17 is a diagram showing another example of placement of the electrodynamic apparatus according to Embodiment 2 of the present disclosure.

In Embodiment 2, the direction (first direction) that the arm 10 extends is parallel to a horizontal direction, and the direction (second direction) that the support 50 extends is parallel to a vertical direction. However, this configuration does not imply any limitation. For example, as shown in FIG. 17, the first direction may be parallel to the vertical direction, and the second direction may be parallel to the horizontal plane.

Figure 18:
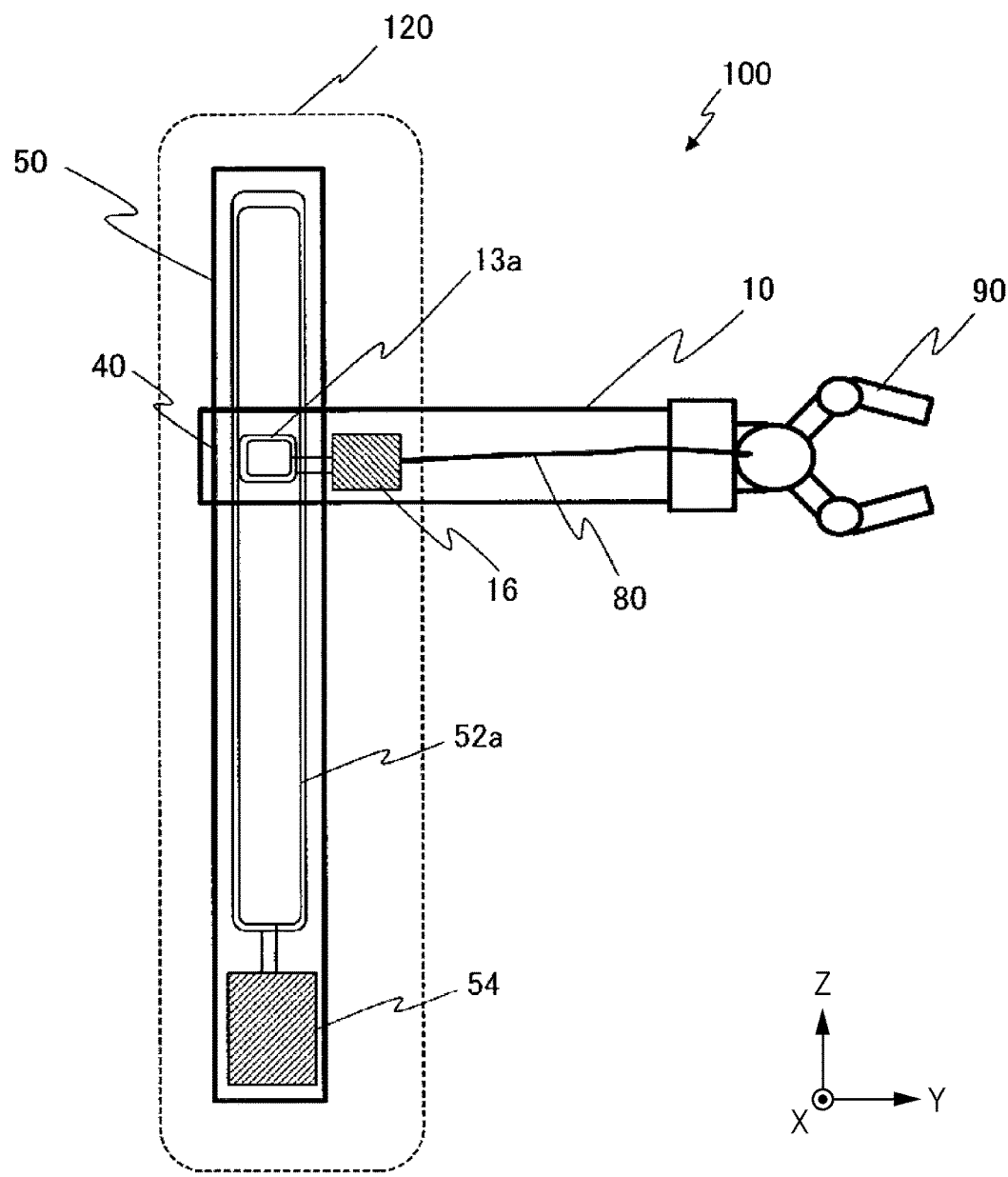
FIG. 18 is a diagram showing configurations of a support and an arm according to Embodiment 2 in more detail.

FIG. 18 is a diagram showing configurations of the support 50 and the arm 10 in more detail. As illustrated, the power transmission coil 52a provided in the support 50 has a wound wire that is longer in shape in the second direction (which is the Z direction in this example) than that of the power reception coil 13a provided in the arm 10. This keeps the power transmission coil 52a and the power reception coil 13a facing each other even when the linear actuator 40 moves the arm 10 along the second direction.

The linear actuator 40 may be provided in the support 50, or may be provided in the arm 10. Some of the components of the linear actuator 40 may be provided in the support 50, and the other may be provided in the arm 10. In a case where the linear actuator 40 has its motor provided in the support 50, DC power outputted from the external DC power source is supplied not only to the power transmission circuit 54 but also to the linear actuator 40. In a case where the linear actuator 40 has its motor provided in the arm 10, DC power supplied from the power reception circuit 16 is supplied not only to the end effector 90 but also to the linear actuator 40.

In Embodiment 2, as in Embodiment 1, the power transmission coil 52a and the power reception coil 13a are disposed so that the power transmission surface of the power transmission coil 52a and the power reception surface of the power reception coil 13a are parallel to the direction of the load applied to the arm 10. This makes it possible to prevent the coupling coefficient from fluctuating.

Figure 19A:
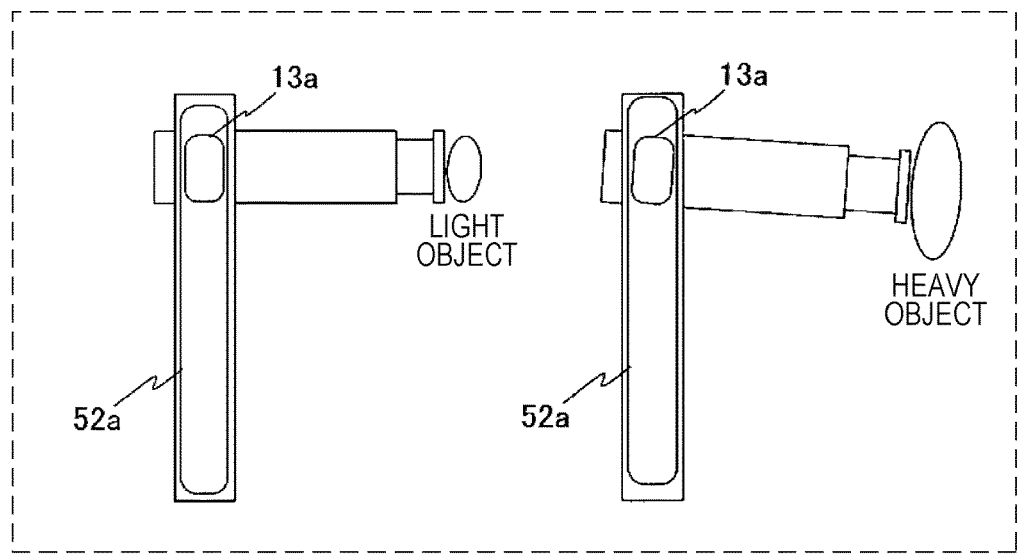
FIG. 19A is a diagram showing an effect of a change in a load applied to the arm in the configuration of Embodiment 2.
Figure 19B:
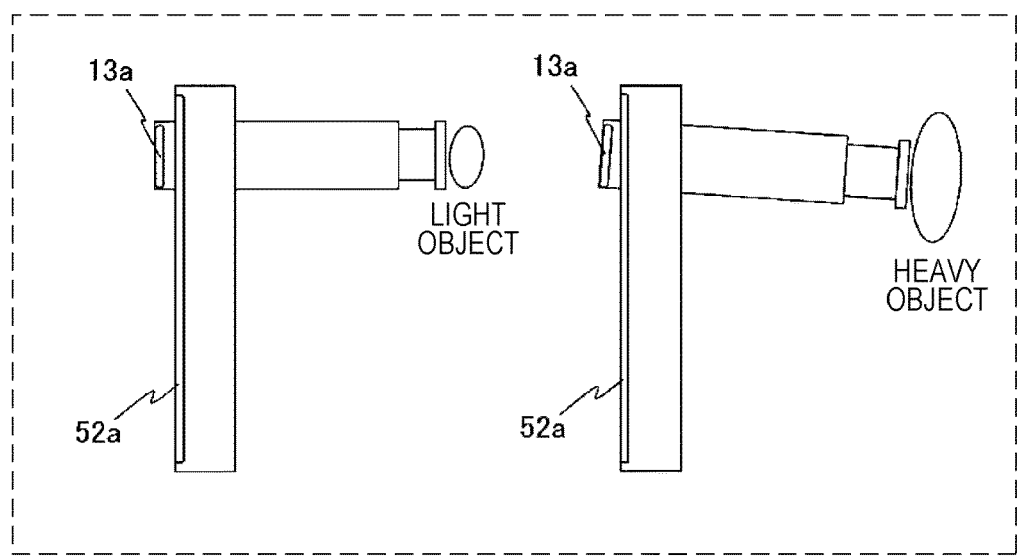
FIG. 19B is a diagram showing an effect of a change in a load applied to the arm in a configuration of a modification of Embodiment 2.

FIGS. 19A and 19B are diagrams for explaining this effect. FIG. 19A shows an effect of a change in the load applied to the arm 10 in the configuration of Embodiment 2. FIG. 19B shows an effect of a change in a load applied to the arm 10 in a configuration of a modification of Embodiment 2. If, as shown in the example shown FIG. 19A, the power transmission surface and the power reception surface are perpendicular to the direction of the moment of a force produced by the load, the state in which the coils face each other is hardly broken even in a case where the end effector 90 is holding a heavy object. This makes it possible to prevent a change in the coupling coefficient. On the other hand, in a case where, as shown in the example shown in FIG. 19B, the power transmission surface and the power reception surface are parallel to the direction of the moment of the force produced by the load, the state in which the coils face each other is easily broken when the end effector 90 is holding a heavy object. This leads to a comparatively large change in the coupling coefficient.

Next, the modification of Embodiment 2 is described.

Figure 20:
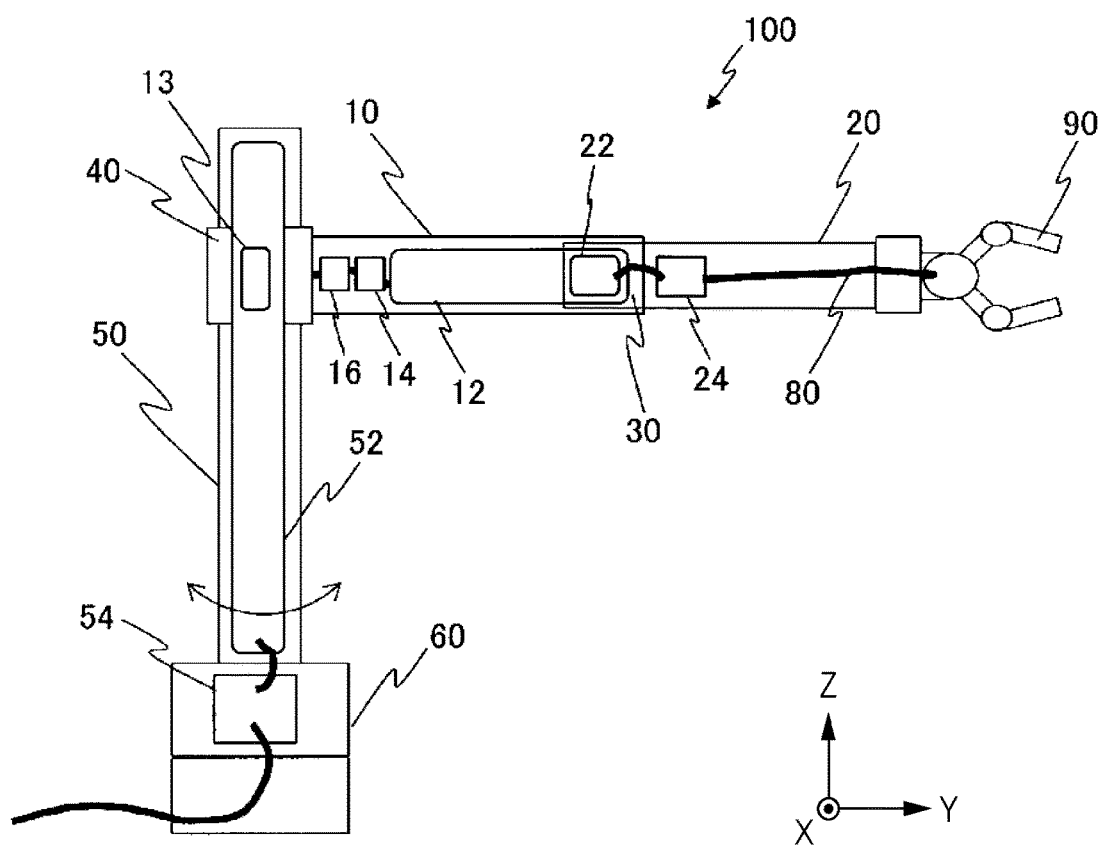
FIG. 20 is a diagram showing the modification of Embodiment 2.

FIG. 20 is a diagram showing the modification of Embodiment 2. In addition to the components shown in FIG. 16, the electrodynamic apparatus 100 illustrated includes a mechanism that extends and retracts arms, as in Embodiment 1. As in Embodiment 1, this electrodynamic apparatus 100 includes a second arm 20 at a distal end of which an end effector 90 is provided and a linear actuator 30 that moves the second arm 20 along a first direction (which is the Y direction in this example) with respect to a first arm 10. This allows the end effector 90 to move not only along a second direction (Z direction) but also along the first direction (Y direction).

In Embodiment 2, the first arm 10 includes a power reception antenna 13, a power transmission antenna 12, a power reception circuit 16 connected between the power reception antenna 13 and the power transmission antenna 12, and a power transmission circuit 14 connected between the power reception antenna 13 and the power transmission antenna 12. The second arm 20 includes a power transmission circuit 24 connected between a power reception antenna 22 and the end effector 90 (load).

Figure 21:
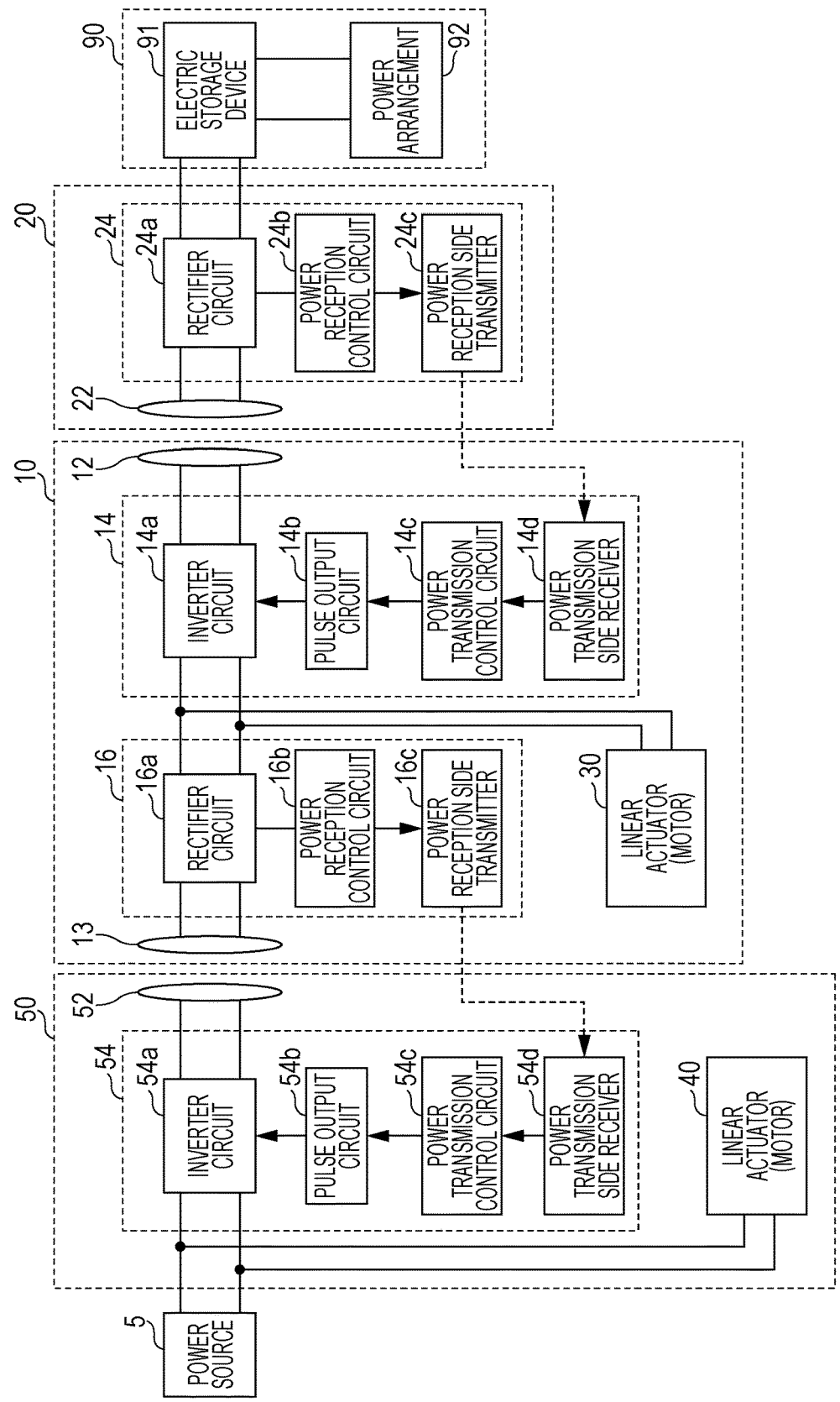
FIG. 21 is a block diagram showing a configuration of the electrodynamic apparatus shown in FIG. 20.

FIG. 21 is a block diagram showing a configuration of the electrodynamic apparatus 100 shown in FIG. 20. In this example, the first arm 10 includes both the power reception circuit 16 and the power transmission circuit 14. The power reception circuit 16 includes a rectifier circuit 16a connected between the power reception antenna 13 and the linear actuator 30, a power reception control circuit 16b, and a power reception side transmitter 16c. The power reception circuit 16 is identical in configuration to the power reception circuit 24 provided in the second arm 20. The power transmission circuit 14 includes an inverter circuit 14a connected between the rectifier circuit 16a and the power transmission antenna 12, a pulse output circuit 14b, a power transmission control circuit 14c, and a power transmission side receiver 14d. The power transmission circuit 14 is identical in configuration to the power transmission circuit 54 provided in the support 50. In this example, the motor of the linear actuator 30 provided in the first arm 10 operates on DC power outputted from the rectifier circuit 16a and moves the second arm 20 along the Y direction.

In the example configuration of FIG. 21, the linear actuator 30, which moves the second arm 20 along the first direction (Y direction), is provided in the first arm 10. Alternatively, as described with reference to FIG. 12B, the second arm 20 may include the linear actuator 30. In that case, the rectifier circuit 24a is connected between the power reception antenna 22 and the linear actuator 30 and between the power reception antenna 22 and the load (end effector 90). Similarly, a linear actuator 40 that moves the first arm 10 along the second direction (Z direction) may be provided in the first arm 10. In that case, as with the linear actuator 30, the linear actuator 40 is connected to a stage following the rectifier circuit 16a and operates on DC power from the rectifier circuit 16a.

As can be seen from FIG. 21, the electrodynamic apparatus 100 according to Embodiment 2 can be said to be a multistage interconnection wireless power transmission system. The support 50 corresponds to a power transmission apparatus. The first arm 10 corresponds to a relay apparatus that performs power transmission and power reception. The second arm 20 corresponds to a power reception apparatus.

As shown in FIG. 20 the electrodynamic apparatus 100 according to Embodiment 2 includes a rotating mechanism 60 that rotates the support 50, the first arm 10, the second arm 20, and the end effector 90 about an axis parallel to the second direction (Z direction). Although FIG. 21 omits to illustrate this rotating mechanism 60, wireless transmission of electric power via a power transmission antenna and a power reception antenna may be applied to the rotating mechanism 60, too. The rotating mechanism 60, too, is driven by electric power from the power source 5.

In addition to or instead of the rotating mechanism 60, the electrodynamic apparatus 100 may further include a second rotating mechanism supported by the support 50. Such a second rotating mechanism includes a motor that rotates, for example, the first arm 10 about at least either an axis (which is the Z direction in the example shown in FIG. 20) parallel to the second direction or an axis (which is the X direction in the example shown in FIG. 20) perpendicular to both the first and second directions. This allows the end effector 90 to move with a higher degree of freedom.

Figure 22:
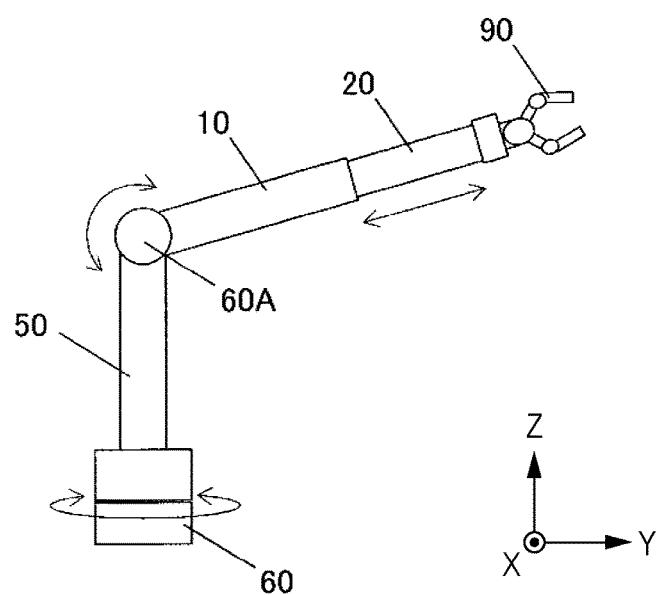
FIG. 22 is a diagram showing an example of an electrodynamic apparatus including a second rotating mechanism.

FIG. 22 is a diagram schematically showing an example of an electrodynamic apparatus 100 including such a second rotating mechanism 60A. In this example, the electrodynamic apparatus 100 includes the second rotating mechanism 60A, which rotates the first arm 10 about an axis of rotation extending in the X direction. This allows the arms 10 and 20 and the end effector 90 to move upward and downward.

In each of the embodiments described above, the second arm 20 is a single arm. Alternatively, the second arm 20 may be a plurality of arms joined together one after another. Such a second arm 20 further includes one or more joints for determining the position and the posture. For a higher degree of freedom, a hexaxial or heptaxial configuration is possible in which a large number of joints are provided. The following describes examples of such configurations.

Figure 23A:
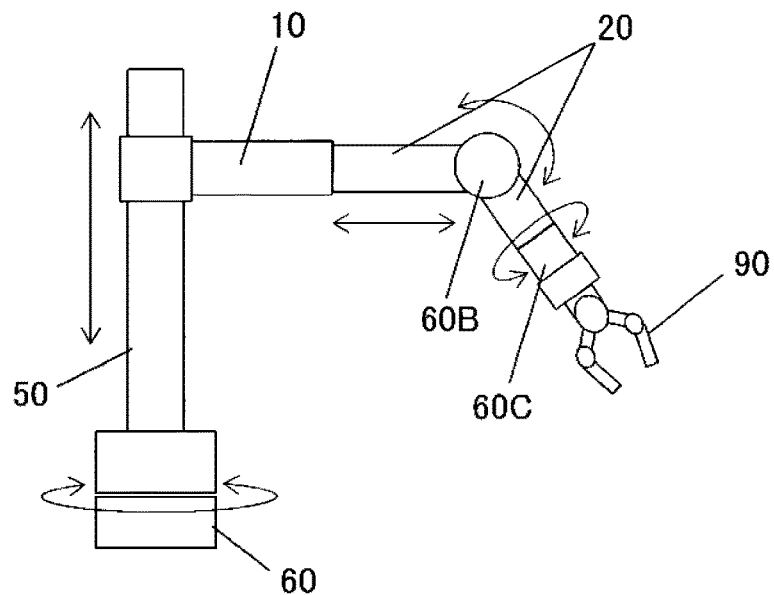
FIG. 23A is a diagram showing an example in which the second arm includes a plurality of parts joined via joints (rotating mechanisms)
Figure 23B:
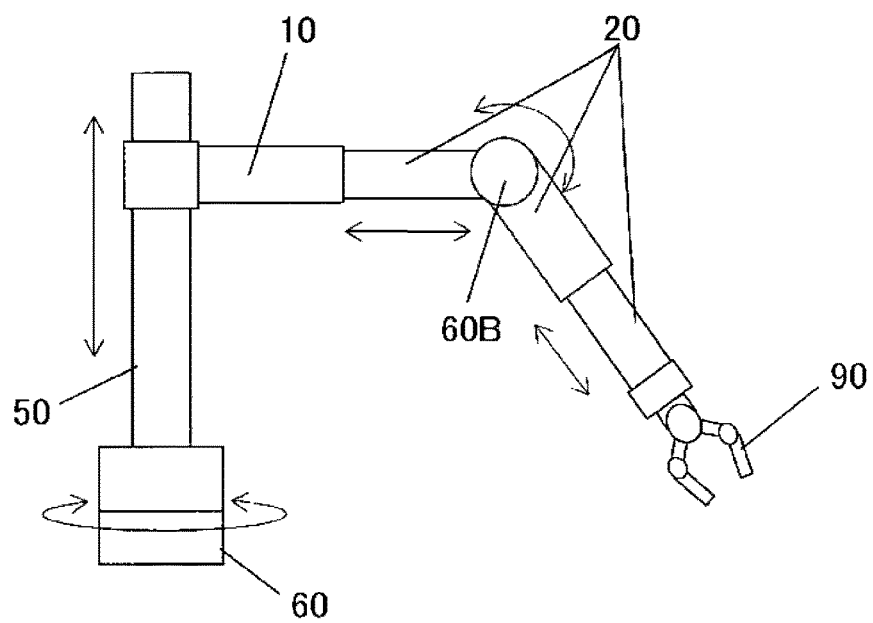
FIG. 23B is a diagram showing an example in which the second arm includes a plurality of parts joined via a joint and has a telescopic mechanism at a distal end thereof.
Figure 23C:
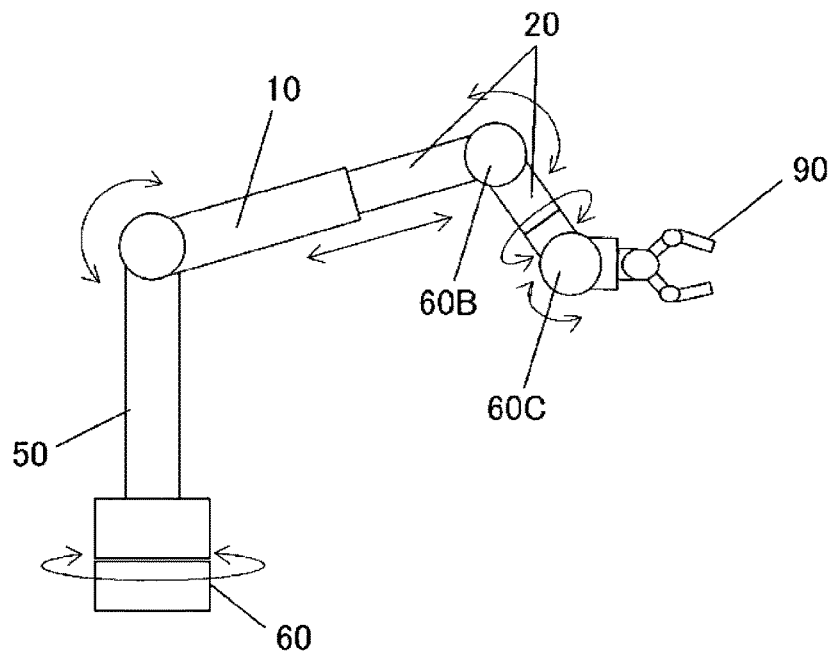
FIG. 23C is a diagram showing an example in which the second arm includes a plurality of parts joined via joints.
Figure 23D:
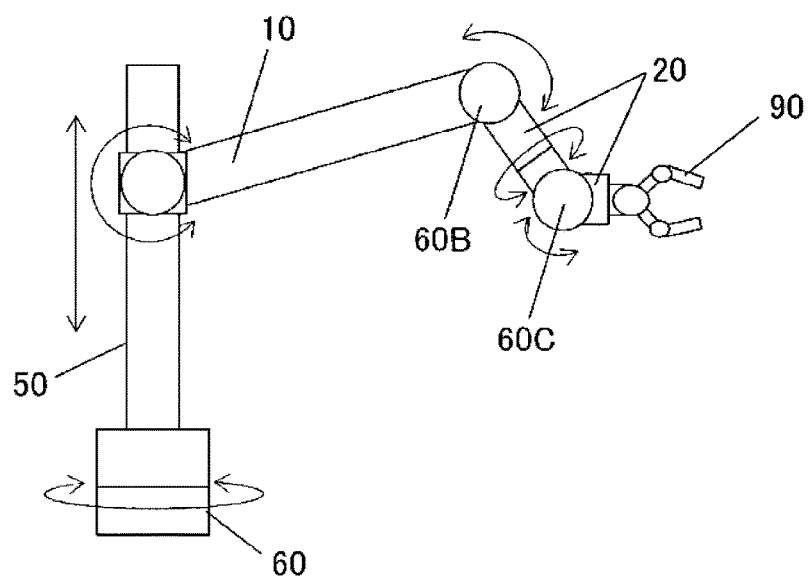
FIG. 23D is a diagram showing an example in which there is no telescopic mechanism between the first arm and the second arm but the second arm has joints.

FIG. 23A shows an example in which the second arm 20 includes a plurality of parts joined via joints (rotating mechanisms) 60B and 60C. FIG. 23B shows an example in which the second arm 20 includes a plurality of parts joined via the joint 60B and has a telescopic mechanism at a distal end thereof. FIG. 23C shows an example in which the second arm 20 includes a plurality of parts joined via the joints 60B and 60C. The example shown in FIG. 23C differs from the example shown in FIG. 23A in term of the direction of the axis of the joint 60C. FIG. 23D shows an example in which there is no telescopic mechanism between the first arm 10 and the second arm 20 but the second arm has the joints 60B and 60C. In any of these configurations, the end effector 90 can move with a much higher degree of freedom. In these examples, multiple stages of wireless power transmission are performed inside of the second arm 20. The multiple stages of wireless power transmission has a structure in which a plurality of relay apparatuses such as the first arm 10 shown in FIG. 21 are joined together one after another.

Thus, the end effector 90 does not need to be connected to a part of an arm directly joined to the first arm 10, but may be provided at a distal end of a plurality of arm parts constituting the second arm 20.

Embodiment 3

Next, Embodiment 3 of the present disclosure is described. As in Embodiment 1, an electrodynamic apparatus according to Embodiment 3 includes a rotating mechanism that rotates an arm with respect to a support and a direct-acting mechanism that extends and retracts an arm. In making a rotational movement of an end effector provided at a distal end of an arm, Embodiment 3 first retracts the arm and then makes the rotational movement. This makes it possible to reduce the torque needed for the rotation and cut down on power use.

The inertia moment with which an object makes a rotational movement is a value obtained by integrating all over the object the product of the mass of each part of the object and the square of the distance from that part to the axis of rotation. Therefore, in the case of a rotation with an arm extended, the inertia moment is greater than in the case of a rotation with the arm retracted. As a result, as the center of gravity of the arm becomes farther away from the center, greater acceleration and deceleration torque is needed. This puts a larger load on the motor. Further, a wider space is required for rotation.

In order to solve such a problem, Embodiment 3 exercises control to start a rotation after moving the center of gravity of the arm closer to the central axis. This reduces the load on the motor and also enables a spatially compact movement.

Figure 24:
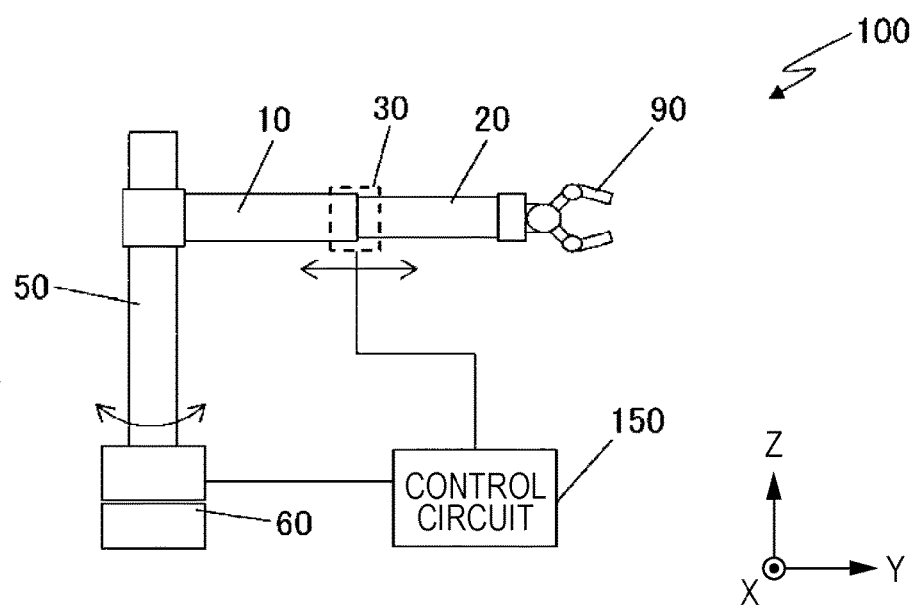
FIG. 24 is a diagram schematically showing a configuration of an electrodynamic apparatus according to Embodiment 3 of the present disclosure.

FIG. 24 is a diagram schematically showing a configuration of an electrodynamic apparatus 100 according to Embodiment 3. This electrodynamic apparatus 100 is identical in structure to the electrodynamic apparatus 100 according to Embodiment 1. That is, the electrodynamic apparatus 100 includes a first arm 10 extending in a first direction, a second arm 20 supported by the first arm 10, a linear actuator 30 that is provided in the first arm 10 or the second arm 20 and moves the second arm 20 along the first direction with respect to the first arm 10, a support 50 extending in a second direction that is different from the first direction and supporting the first arm 10, and a rotating mechanism 60 that rotates the support 50 about an axis of rotation parallel to the second direction. The rotating mechanism 60 includes a motor whose rotation causes the support 50 to rotate. The first arm 10 includes a power transmission antenna, and the second arm 20 include a power reception antenna. The power transmission antenna supplies electric power to the power reception antenna wirelessly. The power reception antenna supplies the supplied electric power to a load electrically connected to the power reception antenna.

A point of difference between the electrodynamic apparatus 100 according to Embodiment 3 and the electrodynamic apparatus 100 according to Embodiment 1 lies in how the rotating mechanism 60 and the linear actuator 30 operate. The electrodynamic apparatus 100 is configured such that in rotating the support 50, the linear actuator 30 moves the center of gravity of the second arm 20 closer to the axis of rotation first. That is, in the placement shown in FIG. 24, the linear actuator 30 moves the second arm 20 in the −Y direction. Then, the rotating mechanism 60 rotates the support 50 by a desired angle. Then, the linear actuator 30 moves the center of gravity of the second arm 20 away from the axis of rotation to cause the end effector 90 to reach a desired place.

In order to achieve the foregoing operation, the electrodynamic apparatus 100 includes a control circuit 150 electrically connected to the respective motors of the linear actuator 30 and the rotating mechanism 60. The control circuit 150 outputs control signals for controlling the motors and thereby causes the linear actuator 30 and the rotating mechanism 60 to execute the foregoing operation. The control circuit 150 may be an integrated circuit, such as a microcontroller, including a memory and a processor. It should be noted that the control circuit 150 may be provided in another apparatus that is independent of the electrodynamic apparatus 100. The control signals may be sent either by cable or wirelessly from such an external control circuit 150 to the linear actuator 30 and the rotating mechanism 60.

Figure 25:
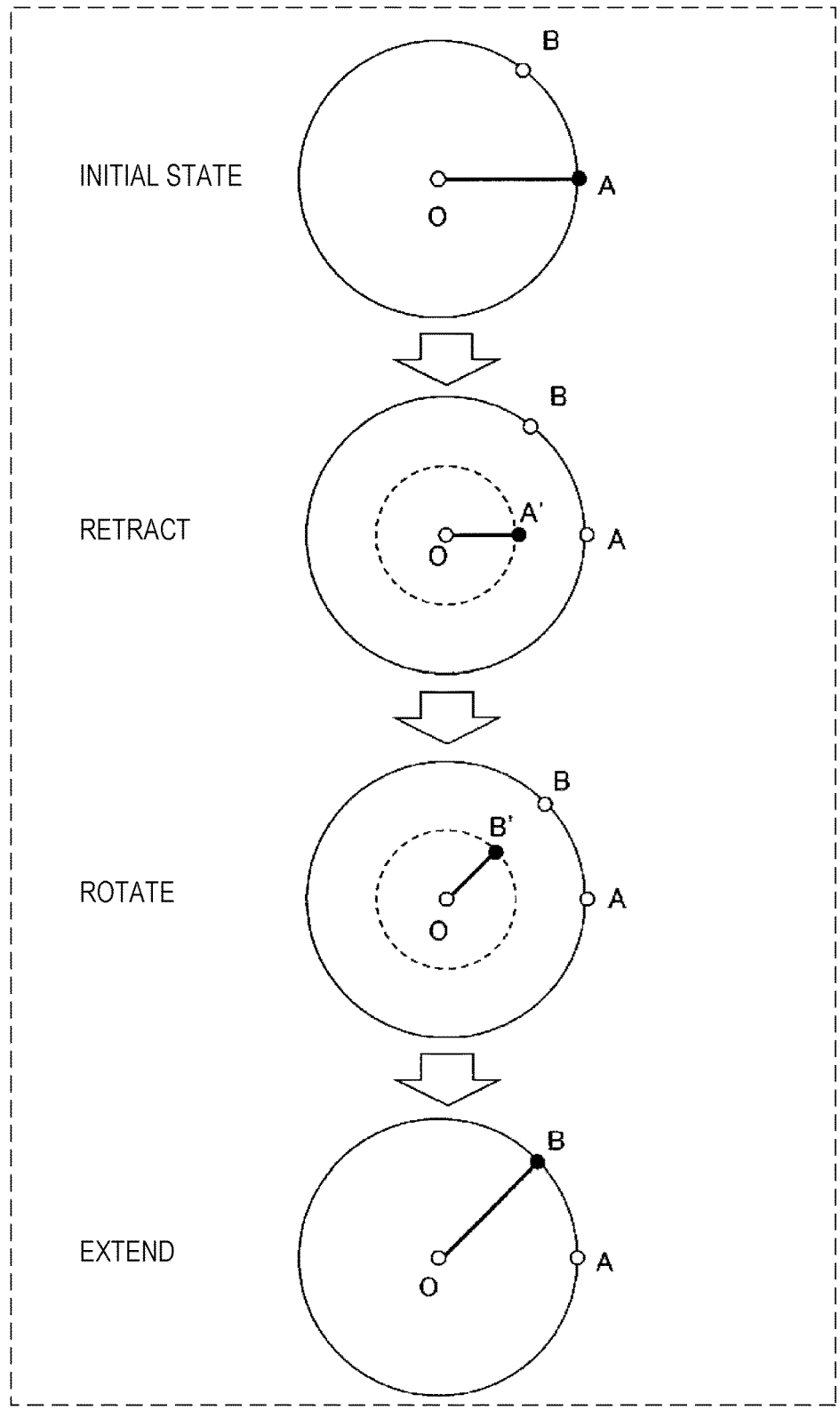
FIG. 25 is a conceptual diagram schematically showing an operation according to Embodiment 3.

FIG. 25 is a conceptual diagram schematically showing the foregoing operation according to Embodiment 3. In FIG. 25, the point O represents the position of the axis of rotation, and the point A represents the initial position of the end effector 90. FIG. 25 shows a trajectory that the end effector 90 follows in a case where the end effector 90 moves from the point A to the point B on the circumference of a circle of the same radius centered at the axis of rotation. As a matter of course, the point A and the point B may be at different distances from the point O. In FIG. 25, the black circle represents the position of the end effector 90. Retracting the arm 20 causes the end effector 90, which is at the point A in the initial state, to move to the point A'. Next, the end effector 90 rotates about the point O and moves to the point B'. Then, extending the arm 20 causes the end effector 90 to move to the point B.

Figure 26:
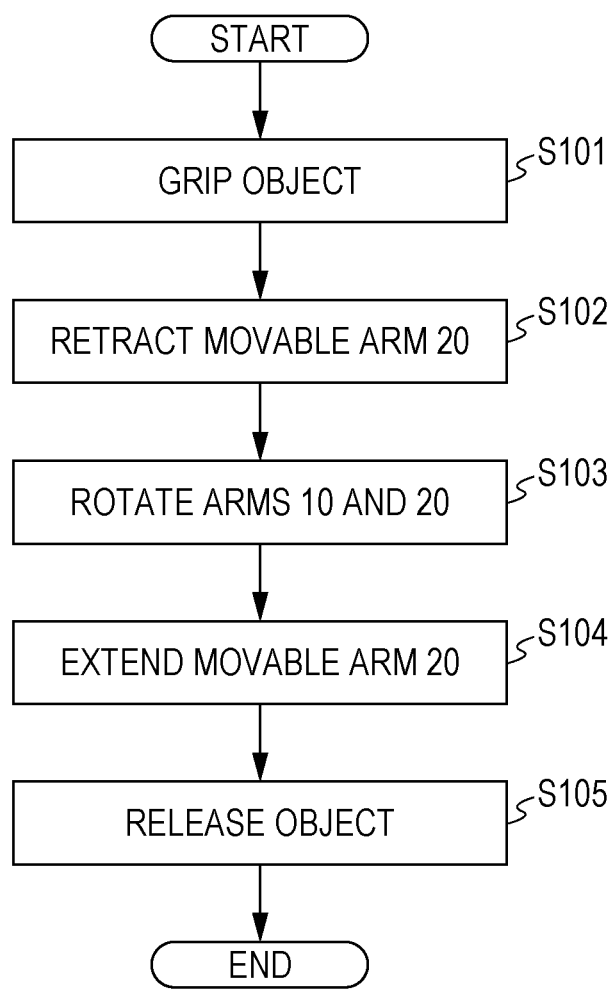
FIG. 26 is a flow chart showing steps of instructions that a control circuit gives to the electrodynamic apparatus according to Embodiment 3.

FIG. 26 is a flow chart showing steps of instructions that the control circuit 150 gives to the electrodynamic apparatus 100 in the foregoing operation. An operation is described here in which the end effector 90 is a hand and the hand grips an article, moves to a predetermined place, and releases the article. This operation may be achieved by the processor executing a computer program stored in the memory of the control circuit 150.

The control circuit 150 first instructs the end effector 90 to grip an object (step S101). This instruction is given, for example, by control signals sent either by cable or wirelessly from the control circuit 150 to motors provided in the end effector 90. Once the end effector 90 grips the object, the control circuit 150 instructs the linear actuator 30 to retract the movable arm 20 by a predetermined amount (step S102). The amount of retraction of the movable arm 20 is determined as appropriate according to the required speed of operation, the performance of the motor of the rotating mechanism 60, and room in the installation location. Next, the control circuit 150 instructs the rotating mechanism 60 to rotate the arms 10 and 20 by a predetermined angle (step S103). The amount of rotation is set at an angle formed by a segment from the point O to the point A and a segment from the point O to the point B. Next, the control circuit 150 instructs the linear actuator 30 to extend the movable arm 20 to the intended length (step S104). Once the end effector 90 reaches the point B, the control circuit 150 instructs the end effector 90 to release the object (step S105).

The foregoing operation allows the electrodynamic apparatus 100 according to Embodiment 3 to reduce the load on the motor provided in the rotating mechanism 60 and move the end effector 90 in a spatially compact manner.

In such a case as that of Embodiment 3 where control is exercised such that the distal end is retracted, then rotated, and again extended, the frequency of extension and retraction by the linear actuator 30 is high. In such a case as that of the comparative example shown in FIGS. 2A and 2B where a cable is present in places where extension and retraction occur, it is necessary to provide a cableveyor (registered trademark) that holds the cable during extension and retraction. However, such a configuration causes the cable to repeatedly bend every time extension and retraction occur, thus leading to cable deterioration and breakage. This makes it necessary to carry out maintenance such as regular replacement of cables. On the other hand, Embodiment 3 applies a wireless power transmission system to the telescopic part and can therefore eliminate the cable. This makes it possible to solve the problem of cable deterioration and breakage.

Embodiment 4

Figure 27:
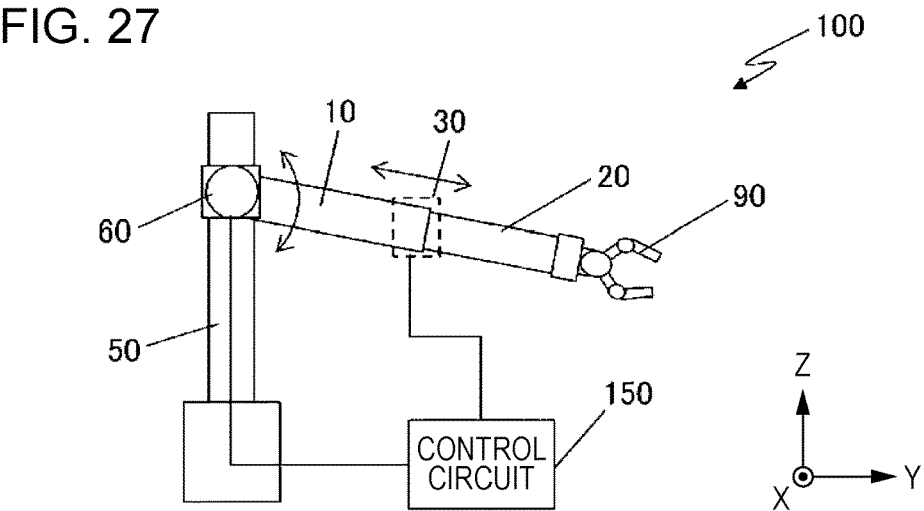
FIG. 27 is a diagram schematically showing a configuration of an electrodynamic apparatus according to Embodiment 4 of the present disclosure.

FIG. 27 is a diagram schematically showing a configuration of an electrodynamic apparatus 100 according to Embodiment 4 of the present disclosure. This electrodynamic apparatus 100 differs from the electrodynamic apparatus 100 according to Embodiment 3 in that the rotating mechanism 60 is not provided at the base of the support 50 but provided at the junction between the support 50 and the first arm 10. The electrodynamic apparatus 100 according to Embodiment 4 includes a support 50, a rotating mechanism that is supported by the support 50 and rotates about an axis of rotation, a first arm 10 that extends in a first direction, is coupled to the rotating mechanism 60, and rotates about the axis of rotation, a second arm 20 supported by the first arm 10, and a linear actuator 30 that is provided in the first arm 10 or the second arm 20 and moves the second arm 20 along the first direction with respect to the first arm 10. The constituent elements is identical in structure to those of Embodiment 3.

In Embodiment 4, as shown in FIG. 27, the rotating mechanism 60 allows the end effector 90 to make upward and downward rotational movements.

In Embodiment 4, too, performing an operation of rotating the arms 10 and 20 causes the problem described in Embodiment 3. For this reason, in Embodiment 4, too, the same control as that of Embodiment 3 is exercised. That is, in rotating the first arm 10, the linear actuator 30 moves the center of gravity of the second arm 20 closer to the axis of rotation first, and then the rotating mechanism 60 rotates the first arm 10. Then, the linear actuator 30 moves the center of gravity of the second arm 20 away from the axis of rotation. Such an operation is achieved by the control circuit 50 controlling the motors of the rotating mechanism 60 and the linear actuator 30.

In Embodiment 4, too, in performing a rotating operation, the second arm 20 is retracted once and then rotated. This makes it possible to reduce the loads on the motor provided in the rotating mechanism 60 and move the end effector 90 in a spatially compact manner.

It should be noted that, in Embodiment 4, too, as in Embodiment 3, a rotating mechanism 60 that rotates the support 50 may be provided. In that case, in performing an operation of rotating the rotating mechanisms 60, the foregoing control is exercised to enable a low-load and space-saving operation in either rotating operation.

Next, other embodiments of the present disclosure are exemplified.

Figure 28:
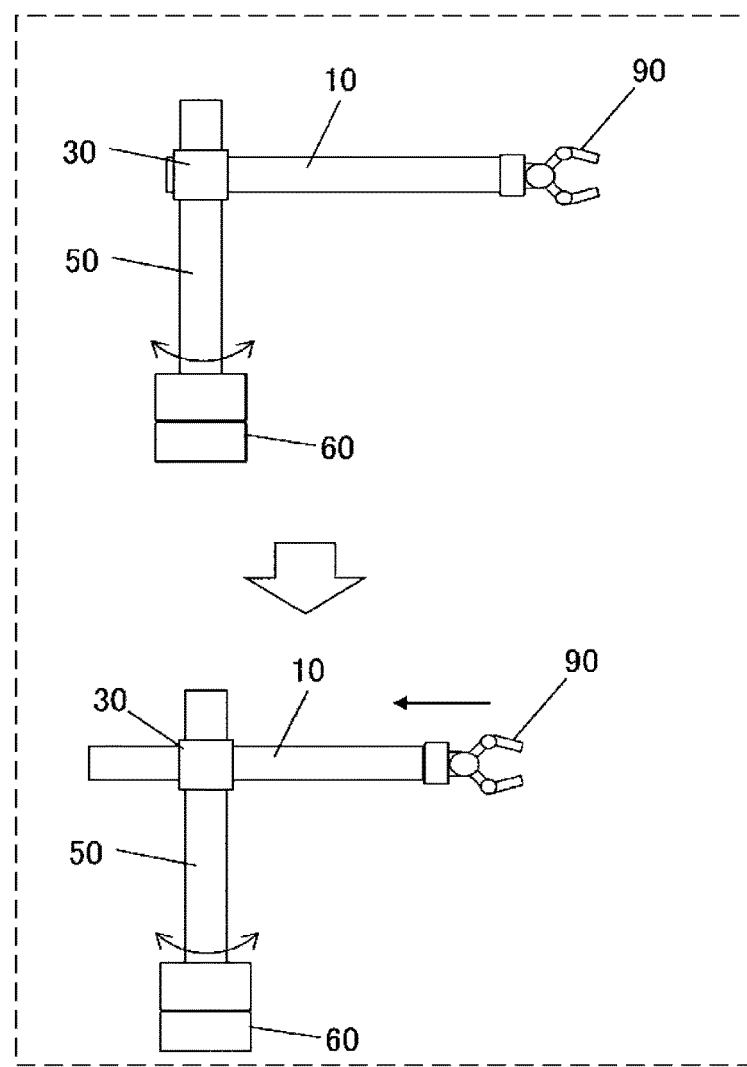
FIG. 28 is a diagram showing another embodiment of the present disclosure.

FIG. 28 is a diagram showing another embodiment of the present disclosure. An electrodynamic apparatus according to this embodiment includes an arm extending in a first direction, a support 50 extending in a second direction that is different from the first direction and supporting the arm 10, a rotating mechanism 60 that rotates the support 50 about an axis of rotation parallel to the second direction, and a linear actuator 30 that moves the center of gravity of the arm 10 along the first direction. The linear actuator 30 is provided in the support 50 or the arm 10. In this embodiment, too, wireless power transmission via a power transmission antenna and a power reception antenna is performed between the support 50 and the arm 10.

In this embodiment, too, in rotating the arm 10, the linear actuator 30 moves the center of gravity of the arm 10 closer to the axis of rotation of the rotating mechanism 60 first. Then, the rotating mechanism 60 rotates the support 50. Then, the linear actuator 30 moves the center of gravity of the arm 10 away from the axis of rotation of the rotating mechanism 60.

Such an operation makes it possible in the present embodiment, too, to reduce the load on the motor of the rotating mechanism 60 and make a space-saving movement.

Figure 29A:
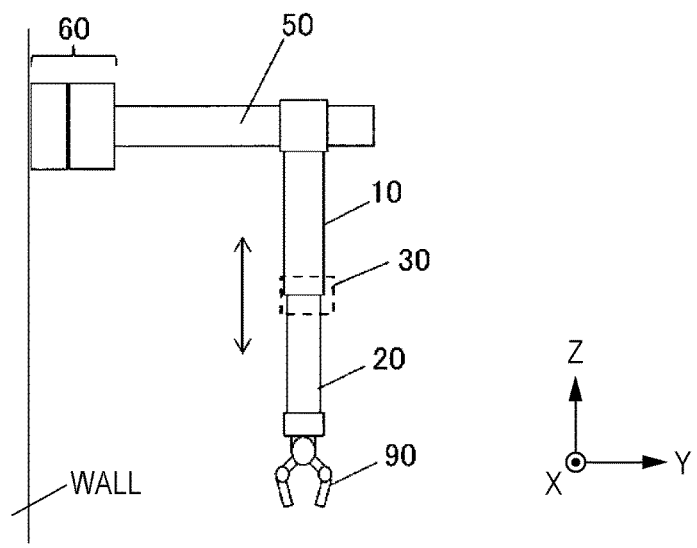
FIG. 29A is a diagram showing an example of a change in orientation of placement of the electrodynamic apparatus according to Embodiment 3.

FIG. 29A is a diagram showing an example of a change in orientation of placement of the electrodynamic apparatus 100 according to Embodiment 3. In this example, the electrodynamic apparatus 100 is installed on a wall surface, and the arms 10 and 20 can rotate about an axis of rotation parallel to the Y axis, which is parallel to the horizontal plane.

Figure 29B:
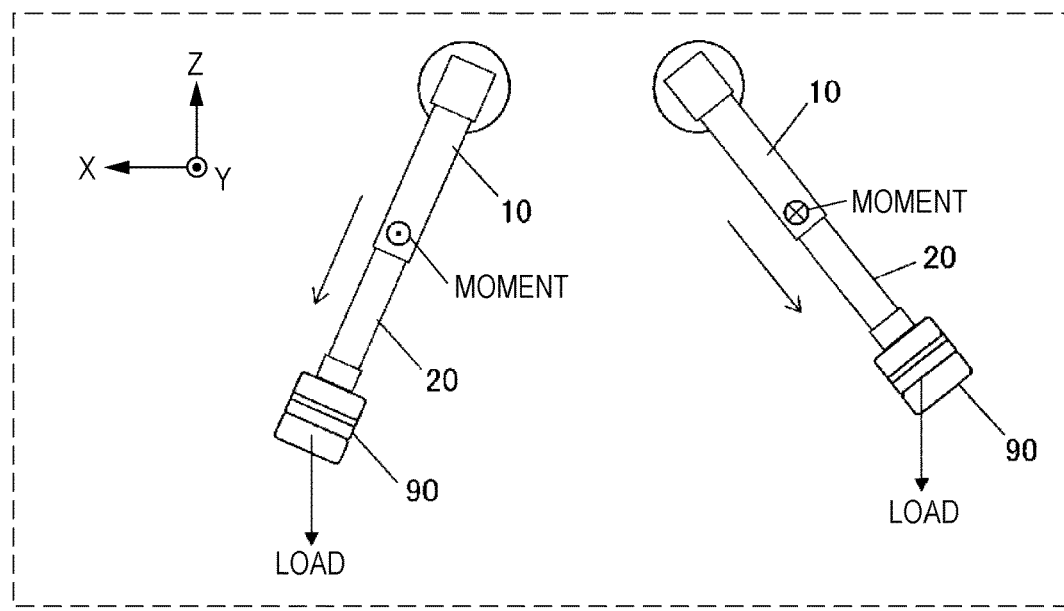
FIG. 29B is a diagram showing the direction of the moment of a force produced by a load in the example configuration of FIG. 29A.

FIG. 29B is a diagram showing the direction of the moment of a force produced by a load in this example. When, as shown on the left side of FIG. 29B, the arms 10 and 20 swing to the positive direction side of the X axis, the direction of the moment of the force produced by the load is the +Y direction. On the other hand, when, as shown on the right side of FIG. 29B, the arms 10 and 20 swing to the negative direction side of the X axis, the direction of the moment of the force produced by the load is the −Y direction. In this example, an effect of this moment on the coupling coefficient between the power transmission coil and the power reception coil is diminished by disposing the power transmission coil and the power reception coil so that the power transmission surface and the power reception surface are parallel to the XZ plane.

Figure 30A:
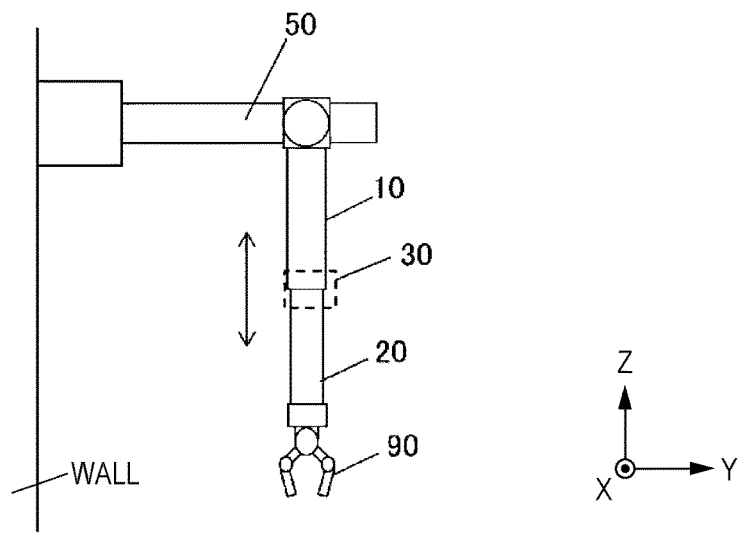
FIG. 30A is a diagram showing an example of a change in orientation of placement of the electrodynamic apparatus according to Embodiment 4.

FIG. 30A is a diagram showing an example of a change in orientation of placement of the electrodynamic apparatus 100 according to Embodiment 4. In this example, the electrodynamic apparatus 100 is installed on a wall surface, and the arms 10 and 20 can rotate about an axis of rotation parallel to the X axis, which is parallel to the horizontal plane.

Figure 30B:
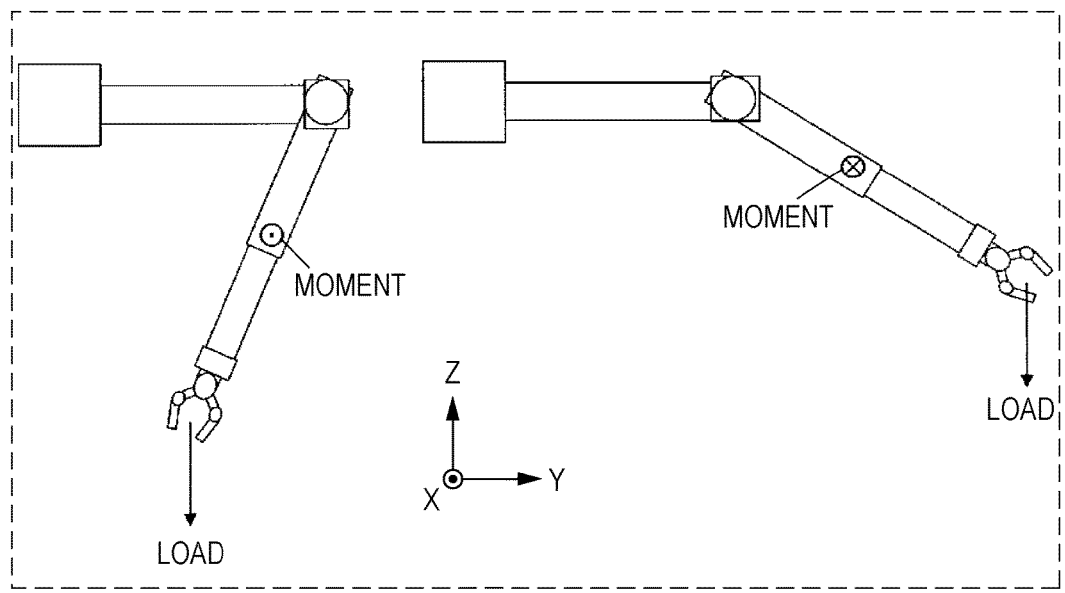
FIG. 30B is a diagram showing the direction of the moment of a force produced by a load in the example configuration of FIG. 30A.

FIG. 30B is a diagram showing the direction of the moment of a force produced by a load in this example. When, as shown on the left side of FIG. 30B, the arms 10 and 20 swing to the negative direction side of the Y axis, the direction of the moment of the force produced by the load is the +X direction. On the other hand, when, as shown on the right side of FIG. 30B, the arms 10 and 20 swing to the positive direction side of the Y axis, the direction of the moment of the force produced by the load is the −X direction. In this example, too, an effect of this moment on the coupling coefficient between the power transmission coil and the power reception coil is diminished by disposing the power transmission coil and the power reception coil so that the power transmission surface and the power reception surface are parallel to the ZY plane.

As described above, the present disclosure encompasses an electrodynamic apparatus and a control method according to the following items.

Item 1

An electrodynamic apparatus including:
a first arm extending in a first direction;
a second arm supported by the first arm; and
a first linear actuator that is provided in the first arm or the second arm and moves the second arm along the first direction with respect to the first arm,
wherein the first arm includes a first power transmission antenna,
the second arm includes a first power reception antenna,
the first power transmission antenna supplies electric power to the first power reception antenna wirelessly, and
the first power reception antenna supplies the supplied electric power to a load electrically connected to the first power reception antenna.

Item 2

The electrodynamic apparatus according to Item 1, wherein the first power transmission antenna includes a first power transmission coil,
the first power reception antenna includes a first power reception antenna, and
the first power transmission coil is electromagnetically coupled to the first power reception antenna and supplies the electric power to the first power reception coil wirelessly.

Item 3

The electrodynamic apparatus according to Item 2, wherein the first power transmission coil has a first power transmission surface surrounded by an outside edge of the first power transmission coil,
the first power reception coil has a first power reception surface surrounded by an outside edge of the first power reception coil, and
the first power transmission surface and the first power reception surface are parallel to a direction of a load applied to the second arm.

Item 4

The electrodynamic apparatus according to any one of Items 1 to 3, further including a support extending in a second direction that is different from the first direction and supporting the first arm.

Item 5

The electrodynamic apparatus according to Item 4, further including a second linear actuator that is provided in the support or the first arm and moves the first arm along the second direction,
wherein the support includes a second power transmission antenna,
the first arm further includes a second power reception antenna, and
the second power transmission antenna supplies electric power to the second power reception antenna wirelessly.

Item 6

The electrodynamic apparatus according to Item 5, wherein the second power transmission antenna includes a second power transmission coil,
the second power reception antenna includes a second power reception antenna, and
the second power transmission coil is electromagnetically coupled to the second power reception antenna and supplies electric power to the second power reception coil wirelessly.

Item 7

The electrodynamic apparatus according to Item 6, wherein the second power transmission coil has a second power transmission surface surrounded by an outside edge of the second power transmission coil,
the second power reception coil has a second power reception surface surrounded by an outside edge of the second power reception coil, and
the second power transmission surface and the second power reception surface are parallel to a direction of a load applied to the first arm.

Item 8

The electrodynamic apparatus according to any one of Items 5 to 7, wherein the first arm includes the first linear actuator,
the first arm further includes a first rectifier circuit connected between the second power reception antenna and the first linear actuator and a first inverter circuit connected between the first rectifier circuit and the first power transmission antenna, and
the second arm further includes a second rectifier circuit connected between the first power reception antenna and the load.

Item 9

The electrodynamic apparatus according to any one of Items 5 to 7, wherein the second arm includes the first linear actuator, and
the second arm further includes a rectifier circuit connected between the first power reception antenna and the first linear actuator and between the first power reception antenna and the load.

Item 10

The electrodynamic apparatus according to any one of Items 5 to 9, further including a first rotating mechanism that rotates the support about an axis parallel to the second direction.

Item 11

The electrodynamic apparatus according to any one of Items 5 to 10, further including a second rotating mechanism that rotates the first arm about at least either an axis parallel to the second direction or an axis perpendicular to both the first and second directions.

Item 12

The electrodynamic apparatus according to any one of Items 1 to 11, further including an end effector disposed at a distal end of the second arm, wherein the load is the end effector.

Item 13

An electrodynamic apparatus including:

an arm extending in a first direction;

a support extending in a second direction that is different from the first direction and supporting the arm; and a linear actuator that is provided in at least either the support or the arm and moves the arm along the second direction, wherein the support includes a power transmission antenna, the arm includes a power reception antenna, the power transmission antenna supplies electric power to the power reception antenna wirelessly, and the power reception antenna supplies the supplied electric power to a load electrically connected to the power reception antenna.

Item 14

The electrodynamic apparatus according to Item 13, wherein the power transmission antenna includes a power transmission coil, the power reception antenna includes a power reception coil, and the power transmission coil is electromagnetically coupled to the power reception coil and supplies electric power to the power reception coil wirelessly.

Item 15

The electrodynamic apparatus according to Item 14, wherein the power transmission coil has a power transmission surface surrounded by an outside edge of the power transmission coil, the power reception coil has a power reception surface surrounded by an outside edge of the power reception coil, and the power transmission surface and the power reception surface are parallel to a direction of a load applied to the arm.

Item 16

The electrodynamic apparatus according to any one of Items 13 to 15, wherein the support further includes an inverter circuit connected to the power transmission antenna, and the arm further includes a rectifier circuit connected between the power reception antenna and the load.

Item 17

The electrodynamic apparatus according to any one of Items 13 to 16, further including a first rotating mechanism that rotates the support about an axis parallel to the second direction.

Item 18

The electrodynamic apparatus according to any one of Items 13 to 17, further including a second rotating mechanism that rotates the arm about at least either an axis parallel to the second direction or an axis perpendicular to both the first and second directions.

Item 19

The electrodynamic apparatus according to any one of Items 13 to 18, further including an end effector disposed at a distal end of the arm, wherein the load is the end effector.

Item 20

An electrodynamic apparatus including:

a first arm extending in a first direction;

a second arm supported by the first arm;

a linear actuator that is provided in the first arm or the second arm and moves the second arm along the first direction with respect to the first arm;

a support extending in a second direction that is different from the first direction and supporting the first arm; and a rotating mechanism that rotates the support about an axis of rotation parallel to the second direction, wherein the first arm includes a power transmission antenna, the second arm includes a power reception antenna, the power transmission antenna supplies electric power to the power reception antenna wirelessly, the power reception antenna supplies the supplied electric power to a load electrically connected to the power reception antenna, and in rotating the support, the linear actuator moves the center of gravity of the second arm closer to the axis of rotation first, and then the rotating mechanism rotates the support.

Item 21

The electrodynamic apparatus according to Item 20, wherein in rotating the support, the linear actuator moves the center of gravity of the second arm closer to the axis of rotation first, and then the rotating mechanism rotates the support, and then the linear actuator moves the center of gravity of the second arm away from the axis of rotation.

Item 22

The electrodynamic apparatus according to Item 20 or 21, further including a control circuit that controls the linear actuator and the rotating mechanism, wherein in rotating the support, the control circuit controls the linear actuator to move the center of gravity of the second arm closer to the axis of rotation first, and then controls the rotating mechanism to rotate the support.

Item 23

The electrodynamic apparatus according to Item 22, wherein in rotating the support, the controller controls the linear actuator to move the center of gravity of the second arm closer to the axis of rotation first, then controls the rotating mechanism to rotate the support, and then controls the linear actuator to move the center of gravity of the second arm away from the axis of rotation.

Item 24

The electrodynamic apparatus according to any one of Items 20 to 23, wherein the rotating mechanism includes a motor whose rotation causes the support to rotate.

Item 25

An electrodynamic apparatus including:

a support;

a rotating mechanism that is supported by the support and rotates about an axis of rotation;

a first arm that extends in a first direction, is coupled to the rotating mechanism, and rotates about the axis of rotation;

a second arm supported by the first arm; and a linear actuator that is provided in the first arm or the second arm and moves the second arm along the first direction with respect to the first arm, wherein the first arm includes a power transmission antenna, the second arm includes a power reception antenna, the power transmission antenna supplies electric power to the power reception antenna wirelessly, the power reception antenna supplies the supplied electric power to a load electrically connected to the power reception antenna, and in rotating the first arm, the linear actuator moves the center of gravity of the second arm closer to the axis of rotation first, and then the rotating mechanism rotates the first arm.

Item 26

The electrodynamic apparatus according to Item 25, wherein in rotating the first arm, the linear actuator moves the center of gravity of the second arm closer to the axis of rotation first, and then the rotating mechanism rotates the first arm, and then the linear actuator moves the center of gravity of the second arm away from the axis of rotation.

Item 27

The electrodynamic apparatus according to Item 25 or 26, further including a control circuit that controls the linear actuator and the rotating mechanism, wherein in rotating the first arm, the control circuit controls the linear actuator to move the center of gravity of the second arm closer to the axis of rotation first, and then controls the rotating mechanism to rotate the first arm.

Item 28

The electrodynamic apparatus according to Item 27, wherein in rotating the first arm, the controller controls the linear actuator to move the center of gravity of the second arm closer to the axis of rotation first, then controls the rotating mechanism to rotate the first arm, and then controls the linear actuator to move the center of gravity of the second arm away from the axis of rotation.

Item 29

The electrodynamic apparatus according to any one of Items 25 to 28, wherein the rotating mechanism includes a motor whose rotation causes the second arm to rotate.

Item 30

The electrodynamic apparatus according to any one of Items 20 to 29, wherein the power transmission antenna includes a power transmission coil, the power reception antenna includes a power reception coil, and the power transmission coil is electromagnetically coupled to the power reception coil and supplies electric power to the power reception coil wirelessly.

Item 31

The electrodynamic apparatus according to Item 30, wherein the power transmission coil has a power transmission surface surrounded by an outside edge of the power transmission coil, the power reception coil has a power reception surface surrounded by an outside edge of the power reception coil, and the power transmission surface and the power reception surface are parallel to a direction of a load applied to the second arm.

Item 32

The electrodynamic apparatus according to any one of Items 20 to 31, wherein the first arm further includes an inverter circuit connected to the power transmission antenna, and the second arm further includes a rectifier circuit connected between the power reception antenna and the load.

Item 33

The electrodynamic apparatus according to any one of Items 20 to 32, further including an end effector disposed at a distal end of the second arm, wherein the load is the end effector.

Item 34

A method for controlling an electrodynamic apparatus, the electrodynamic apparatus including:

a first arm including a power transmission antenna and extending in a first direction;

a second arm including a power reception antenna and supported by the first arm;

a linear actuator that is provided in the first arm or the second arm and moves the second arm along the first direction with respect to the first arm;

a support extending in a second direction that is different from the first direction and supporting the first arm; and a rotating mechanism that rotates the support about an axis of rotation parallel to the second direction, wherein the power transmission antenna supplies electric power to the power reception antenna wirelessly, and the power reception antenna supplies the supplied electric power to a load electrically connected to the power reception antenna, the method including, in rotating the support, controlling the linear actuator to move the center of gravity of the second arm closer to the axis of rotation first, and then controlling the rotating mechanism to rotate the support.

Item 35

A method for controlling an electrodynamic apparatus, the electrodynamic apparatus including:

a support;

a rotating mechanism that is supported by the support and rotates about an axis of rotation;

a first arm that extends in a first direction, is coupled to the rotating mechanism, and rotates about the axis of rotation;

a second arm supported by the first arm; and a linear actuator that is provided in the first arm or the second arm and moves the second arm along the first direction with respect to the first arm, wherein the first arm includes a power transmission antenna, the second arm includes a power reception antenna, the power transmission antenna supplies electric power to the power reception antenna wirelessly, and the power reception antenna supplies the supplied electric power to a load electrically connected to the power reception antenna, the method including, in rotating the first arm, controlling the linear actuator to move the center of gravity of the second arm closer to the axis of rotation first, and then controlling the rotating mechanism to rotate the first arm.

Item 36

The method according to Item 34 or 35, wherein after the support has been rotated, the linear actuator is controlled to move the center of gravity of the second arm away from the axis of rotation.

The art of the present disclosure is applicable to an electrodynamic apparatus such as a robot that is used, for example, in a factory.

What is claimed is:

1. An electrodynamic apparatus comprising:
a first arm extending in a first direction;
a second arm supported by the first arm;
a first linear actuator that is provided in the first arm or the second arm and moves the second arm along the first direction with respect to the first arm,
a support extending in a second direction that is different from the first direction and supporting the first arm; and
a second linear actuator that is provided in the support or the first arm and moves the first arm along the second direction,
wherein the first arm includes a first power transmission antenna, the second arm includes a first power reception antenna,
the first power transmission antenna supplies electric power to the first power reception antenna wirelessly, and
the first power reception antenna supplies the supplied electric power to a load electrically connected to the first power reception antenna,
the support includes a second power transmission antenna,
the first arm further includes a second power reception antenna, and
the second power transmission antenna supplies electric power to the second power reception antenna wirelessly.

2. The electrodynamic apparatus according to claim 1, wherein the first power transmission antenna includes a first power transmission coil,
the first power reception antenna includes a first power reception coil, and
the first power transmission coil is electromagnetically coupled to the first power reception coil and supplies the electric power to the first power reception coil wirelessly.

3. The electrodynamic apparatus according to claim 2, wherein the first power transmission coil has a first power transmission surface surrounded by an outside edge of the first power transmission coil,
the first power reception coil has a first power reception surface surrounded by an outside edge of the first power reception coil, and
the first power transmission surface and the first power reception surface are parallel to a direction of a load applied to the second arm.

4. The electrodynamic apparatus according to claim 1, wherein the second power transmission antenna includes a second power transmission coil,
the second power reception antenna includes a second power reception coil, and
the second power transmission coil is electromagnetically coupled to the second power reception coil and supplies electric power to the second power reception coil wirelessly.

5. The electrodynamic apparatus according to claim 4, wherein the second power transmission coil has a second power transmission surface surrounded by an outside edge of the second power transmission coil,
the second power reception coil has a second power reception surface surrounded by an outside edge of the second power reception coil, and
the second power transmission surface and the second power reception surface are parallel to a direction of a load applied to the first arm.

6. The electrodynamic apparatus according to claim 1, wherein the first arm includes the first linear actuator,
the first arm further includes a first rectifier circuit connected between the second power reception antenna and the first linear actuator and a first inverter circuit connected between the first rectifier circuit and the first power transmission antenna, and
the second arm further includes a second rectifier circuit connected between the first power reception antenna and the load.

7. The electrodynamic apparatus according to claim 1, wherein the second arm includes the first linear actuator, and
the second arm further includes a rectifier circuit connected between the first power reception antenna and the first linear actuator and between the first power reception antenna and the load.

8. The electrodynamic apparatus according to claim 1, further comprising a first rotating mechanism that rotates the support about an axis parallel to the second direction.

9. The electrodynamic apparatus according to claim 1, further comprising a second rotating mechanism that rotates the first arm about at least either an axis parallel to the second direction or an axis perpendicular to both the first and second directions.

10. The electrodynamic apparatus according to claim 1, further comprising an end effector disposed at a distal end of the second arm,
wherein the load is the end effector.

11. The electrodynamic apparatus according to claim 1, wherein the support further includes an inverter circuit connected to the power transmission antenna, and
the arm further includes a rectifier circuit connected between the power reception antenna and the load.

12. The electrodynamic apparatus according to claim 1, further comprising a first rotating mechanism that rotates the support about an axis parallel to the second direction.

13. The electrodynamic apparatus according to claim 1, further comprising a second rotating mechanism that rotates the arm about at least either an axis parallel to the second direction or an axis perpendicular to both the first and second directions.

* * * * *